US011089368B2

(12) United States Patent
Webb et al.

(10) Patent No.: US 11,089,368 B2
(45) Date of Patent: *Aug. 10, 2021

(54) MEDIA CONTENT RIGHTS TRANSFERAL BASED ON A PROTOCOL FOR MANAGEMENT OF MEDIA CONTENT RIGHTS USING A DISTRIBUTED MEDIA RIGHTS TRANSACTION LEDGER

(71) Applicant: Turner Broadcasting Systems, Inc., Atlanta, GA (US)

(72) Inventors: Nicolas Paul Webb, McDonough, GA (US); Nishith Kumar Sinha, Mableton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/571,691

(22) Filed: Sep. 16, 2019

(65) Prior Publication Data

US 2020/0228866 A1 Jul. 16, 2020

(51) Int. Cl.
*H04L 29/06* (2006.01)
*H04N 21/4627* (2011.01)
(Continued)

(52) U.S. Cl.
CPC ..... *H04N 21/4627* (2013.01); *G06F 16/1824* (2019.01); *G06F 21/105* (2013.01);
(Continued)

(58) Field of Classification Search
CPC ........... H04N 21/4627; H04N 21/2347; H04N 21/44222; H04N 21/4622;
(Continued)

(56) References Cited

U.S. PATENT DOCUMENTS 7,290,699 B2 11/2007 Reddy et al.
8,639,625 B1 1/2014 Ginter et al.
(Continued)

OTHER PUBLICATIONS

Notice of Allowance for U.S. Appl. No. 16/246,160 dated Mar. 5, 2020.
(Continued)

*Primary Examiner* — Malcolm Cribbs
*Assistant Examiner* — Stephanie S Ham
(74) *Attorney, Agent, or Firm* — Chip Law Group

(57) ABSTRACT

Provided are a system and method for media content rights transferal based on protocol for management of media content rights using distributed media rights transaction ledger. One of first gateway node or first node of plurality of nodes, associated with one of first or second initiating participant, respectively, receives request or determine need for media content rights transferal of media content. Associated instance of distributed media rights transaction ledger is traversed, address of one of second node or second gateway node associated with identifier of one of a first or a second receiving participant is determined, initial media content rights transaction is issued, and new media content rights response transaction is received. Accordingly, media content rights transferal transaction is executed. Each instance of distributed media rights transaction ledger is appended with initial media content rights transaction, new media content rights response transaction, and media content rights transferal transaction.

85 Claims, 13 Drawing Sheets

(51) Int. Cl.

| | |
|---|---|
| *H04N 21/8352* | (2011.01) |
| *H04L 9/06* | (2006.01) |
| *G06F 16/182* | (2019.01) |
| *G06F 21/10* | (2013.01) |
| *G06F 21/64* | (2013.01) |
| *H04L 9/08* | (2006.01) |
| *H04L 9/32* | (2006.01) |
| *H04L 29/08* | (2006.01) |
| *H04N 21/2347* | (2011.01) |
| *H04N 21/442* | (2011.01) |
| *H04N 21/462* | (2011.01) |
| *H04N 21/472* | (2011.01) |

(52) U.S. Cl.
CPC ............ *G06F 21/64* (2013.01); *H04L 9/0643* (2013.01); *H04L 9/0825* (2013.01); *H04L 9/0861* (2013.01); *H04L 9/3236* (2013.01); *H04L 9/3247* (2013.01); *H04L 63/126* (2013.01); *H04L 67/10* (2013.01); *H04L 69/24* (2013.01); *H04N 21/2347* (2013.01); *H04N 21/44222* (2013.01); *H04N 21/4622* (2013.01); *H04N 21/47202* (2013.01); *H04N 21/8352* (2013.01); *H04L 2209/603* (2013.01); *H04L 2463/101* (2013.01)

(58) Field of Classification Search
CPC .......... H04N 21/47202; H04N 21/8352; G06F 16/1824; G06F 21/05; G06F 21/64; H04L 9/0861; H04L 9/3236; H04L 9/3247; H04L 63/126; H04L 67/10; H04L 69/24; H04L 2209/603; H04L 2463/101
See application file for complete search history.

(56) References Cited

U.S. PATENT DOCUMENTS

| | | | |
|---|---|---|---|
| 8,706,610 | B2 | 4/2014 | Fenichel et al. |
| 9,100,814 | B2 | 8/2015 | Kjellberg et al. |
| 9,342,661 | B2 | 5/2016 | Cholas et al. |
| 9,596,513 | B2 | 3/2017 | Narasimhan et al. |
| 2005/0049886 | A1* | 3/2005 | Grannan ................ G06Q 30/06 705/58 |
| 2008/0092181 | A1 | 4/2008 | Britt |
| 2011/0184871 | A1* | 7/2011 | Stahl .................... G06Q 10/06 705/310 |
| 2014/0067596 | A1 | 3/2014 | McGovern et al. |
| 2014/0165209 | A1 | 6/2014 | Yin |
| 2015/0370909 | A1 | 12/2015 | Volach |
| 2016/0321434 | A1 | 11/2016 | McCoy et al. |
| 2017/0278186 | A1 | 9/2017 | Creighton, IV et al. |
| 2019/0028278 | A1* | 1/2019 | Gilson ................ G06F 12/1408 |

OTHER PUBLICATIONS

Coutinho et al., "Service-based negotiation for advanced collaboration in enterprise networks," J Intell Manuf.

Non-Final Office Action for U.S. Appl. No. 16/246,249 dated Oct. 15, 2020.

* cited by examiner

MEDIA CONTENT RIGHTS TRANSFERAL BASED ON A PROTOCOL FOR MANAGEMENT OF MEDIA CONTENT RIGHTS USING A DISTRIBUTED MEDIA RIGHTS TRANSACTION LEDGER

CROSS-REFERENCE TO RELATED APPLICATIONS/INCORPORATION BY REFERENCE

This patent application makes reference to U.S. application Ser. No. 16/246,249, filed Jan. 11, 2019.

The above-referenced patent application is hereby incorporated herein by reference in its entirety.

FIELD OF TECHNOLOGY

Certain embodiments of the disclosure relate to a media content rights management system for digital media and television content. more specifically, certain embodiments of the disclosure relate to media content rights transferal based on a protocol for management of media content rights using a distributed media rights transaction ledger.

BACKGROUND

Advancements in the field of digital media industry, digital media content rights management, and television and broadcasting sector have led to development of various technologies and broadcasting platforms that are revolutionizing the way consumer devices access and consume media content. Usually, broadcasting platforms refer to the types of networks that are used to deliver the media content to the consumers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

The television viewing market is no longer exclusively concerned with whether media content services are viewed on a dedicated television or another device capable of playing media content. As a result of penetration of new technologies in the television and broadcasting sector, it is evident that the future success of television broadcasting will be dependent on the ability of a network provider to simplify access to the content that consumers demand.

Increased competition has led the broadcast providers, the media content transferal rights owners, and the media content re-distributors to handle multiple channels, associated media content rights, and modes of delivery at the same time, which in turn have added unparalleled levels of complexity. This requires installation of large infrastructures and resources to maintain uninterrupted content delivery for existing channel and also meet the ever-increasing demand of new channels.

From a content consumer's perspective, there are multiple content libraries available from different service providers that are increasing in number day-by-day, thereby making it difficult for the content consumers to add and manage different subscriptions to consume the content of their choice. Clearance, negotiation, and transferal of media content rights has become very time consuming due to backing by readily inaccessible/unusable data. Furthermore, third-party measurement of viewership of a media content may be costly, myopic, and often not available for all platforms. There is no mechanism to precisely manage transferal of media content rights amongst various entities. Further, isolated media content catalogs and third-party dependencies to estimate viewership for a media content, such as a TV show, to plan for future advertisement inventory needs and obligations, increase complexities. This in turn increases rework and requires installation of large infrastructures and resources to maintain uninterrupted media content delivery for existing channels and limits the ability of the broadcaster or distributor to change content and/or provide digital rights management (DRM) licenses for desired media content in real time or near-real time.

Thus, a new and advanced ecosystem may be desirable that may provide dynamic and on-the-fly transferal of media content rights amongst various entities and users, so that new and customized media asset offerings can be provided readily in a cost-effective manner. This may result in an enhanced viewer experience to reinvigorate the digital media and television content broadcasting industry.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for media content rights transferal based on a protocol for management of media content rights using a distributed media rights transaction ledger, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
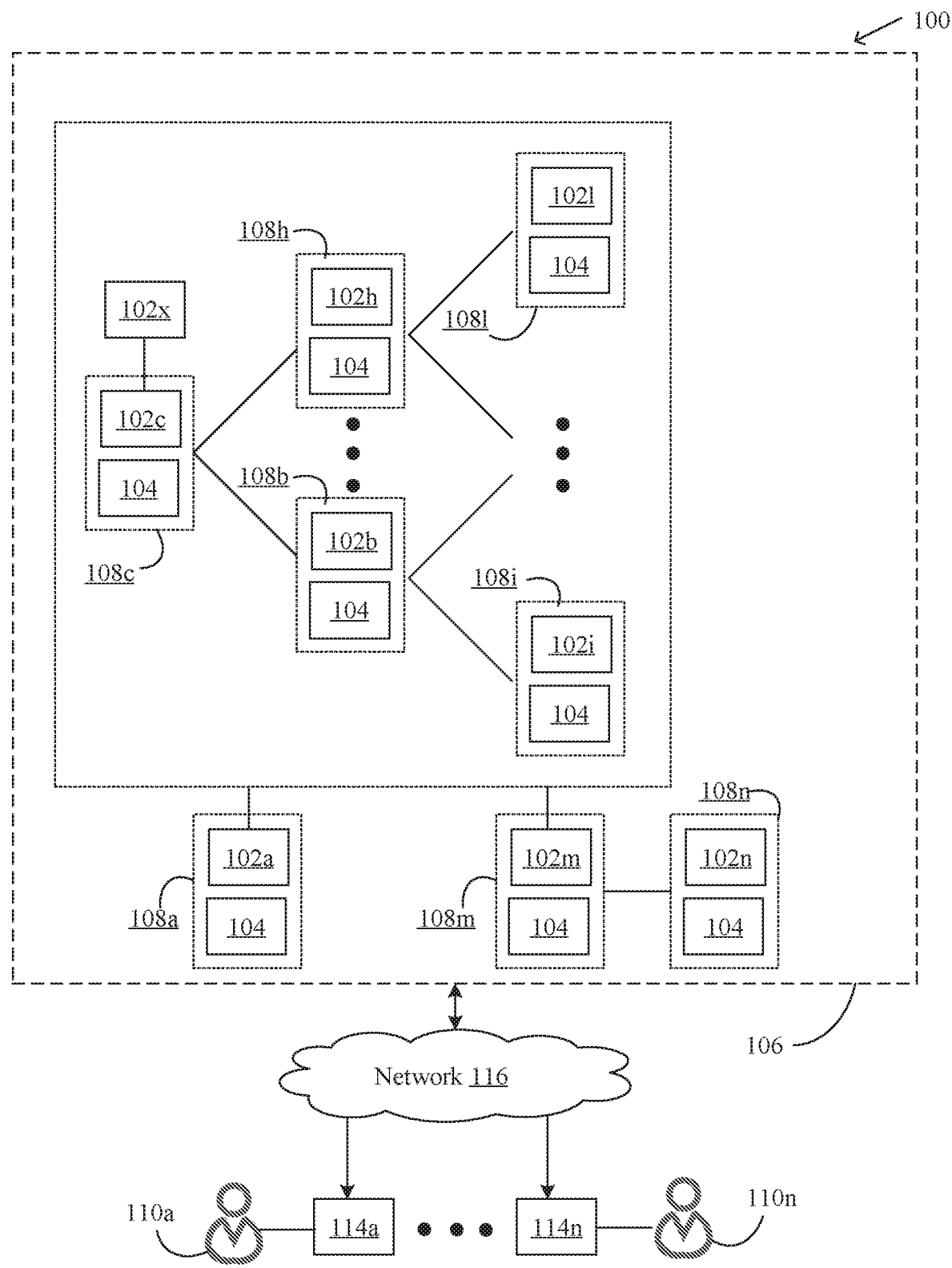
FIG. 1 is a block diagram that illustrates an exemplary system for media content rights transferal based on a protocol for management of media content rights using a distributed media rights transaction ledger, in accordance with an exemplary embodiment of the disclosure.

Certain embodiments of the disclosure may be found in a method and system for media content rights transferal based on a protocol for management of media content rights using a distributed media rights transaction ledger. Various embodiments of the disclosure provide a method and system that efficiently controls and secures the transferal, re-distribution, enforcement, tracking, and media content rights transferal based on a protocol for management of media content rights using a distributed media rights transaction ledger. The disclosed method and system provide a simplified media content rights transferal using the distributed media rights transaction ledger in a cost-effective and seamless manner. Various embodiments of the disclosure further provide a mechanism by which the participants, such as the content owners, distributors, and the content consumers, may functionally interact with each other seamlessly and securely to enable simplified, unified, and customized access to the media content that content consumers demand. The disclosed method and system further provide dynamic and on-the-fly transferal of media content rights to readily provide new and customized media asset offerings in a cost-effective manner and also, enhanced viewer experience to reinvigorate and transform the digital media and television content broadcasting industry.

In accordance with various embodiments of the disclosure, a system is provided for media content rights transferal based on a protocol for management of media content rights using a distributed media rights transaction ledger. In an embodiment, the system may comprise a plurality of nodes configured to interact with each other in accordance with a defined protocol in a communication network. One of a first gateway node or a first node of the plurality of nodes, associated with one of a first initiating participant or a second initiating participant, respectively, may be configured to receive a request or determine a need for transferal of media content rights of a media content. An associated instance of a distributed media rights transaction ledger may be traversed to determine an address of one of a second node or a second gateway node associated with at least an identifier of one of a first receiving participant or a second receiving participant. An initial media content rights transaction, which includes at least a transaction identifier that indicates a grant offer for the transferal of the media content rights, may be issued to one of the second node or the second gateway node. One of the second gateway node associated with the first receiving participant or the second node associated with the second receiving participant may be configured to issue a new media content rights response transaction based on verification, evaluation, and/or acceptance of the grant offer in the initial media content rights transaction. Based on the new media content rights response transaction, a media content rights transferal transaction may be executed between one of the first initiating participant or the second initiating participant and one of the first receiving participant or the second receiving participant. A plurality of instances of the distributed media rights transaction ledger may be associated with a respective node of the plurality of nodes. Each instance of the distributed media rights transaction ledger may be appended with at least the initial media content rights transaction, the new media content rights response transaction, and/or the media content rights transferal transaction.

FIG. 1 is a block diagram that illustrates an exemplary system for media content rights transferal based on a protocol for management of media content rights using a distributed media rights transaction ledger, in accordance with an exemplary embodiment of the disclosure. The operation of FIG. 1 is described herein in conjunction with FIGS. 2A to 2C, which depict exemplary message flows for media content rights transferal based on a protocol for management of media content rights using a distributed media rights transaction ledger in the ecosystem 100 of FIG. 1, in accordance with an exemplary embodiment of the disclosure.

Referring to FIG. 1, there is shown a network of nodes and participants, hereinafter "ecosystem 100", for dynamic transferal of media content rights, in accordance with an exemplary embodiment of the disclosure. The ecosystem 100 may comprise a plurality of nodes 102a, . . . , 102n that are communicatively coupled to each other. There is shown a distributed media rights transaction ledger 104 that remains distributed and synchronized with the plurality of nodes 102a, . . . , 102n, in a communication network 106. There is further shown a plurality of participants 108a, . . . , 108n which may be associated with corresponding nodes from the plurality of nodes 102a, . . . , 102n. One or more nodes from the plurality of nodes 102a, . . . , 102n may be configured to manage a plurality of media content rights transactions with one or more remaining nodes of the plurality of nodes 102a, . . . , 102n. The plurality of participants 108a, . . . , 108n and 110a, . . . , 110n include a plurality of entities 108a, . . . , 108n and a plurality of content consumers 110a, . . . , 110n. There is further shown a plurality of consumer devices 114a, . . . , 114n associated with respective content consumers of the plurality of content consumers 110a, . . . , 110n. The communication network 106 may be communicatively coupled to the plurality of content consumers 110a, . . . , 110n via a network 116. It may be noted that for purposes of description, there will be discussed a first gateway node 102a and a first node 102b of the plurality of nodes 102a, . . . , 102n, associated with one of a first initiating participant (interchangeably used with a first content consumer 110a) and a second initiating participant (interchangeably used with a first content distributor entity 108b), respectively. Further, a second gateway node 102m and a second node 102n of the plurality of nodes 102a, . . . , 102n may be associated with a first receiving participant (interchangeably used with a second content consumer 110n) and a second receiving participant (interchangeably used with a second content distributor entity 108n). However, it should not be construed to be limiting and there may exist multiple instances of the gateway nodes and other nodes and associated participants in the ecosystem 100, without any deviation from the scope of the disclosure.

The ecosystem 100 may provide an online platform for creation of a digital marketplace where new media markets, such as a content trading markets, may emerge. Such a digital marketplace for media content rights may then be realized based on a defined protocol or a method which defines a standard for the plurality of nodes 102a, . . . , 102n to communicatively couple and interact with each other. The defined protocol may be configured to establish a network of the plurality of nodes 102a, . . . , 102n, and the plurality of participants 108a, . . . , 108n and 110a, . . . , 110n upon which media content rights may be acquired, redistributed, constraints enforced, negotiated, transferred or consumed. Among the plurality of participants 108a, . . . , 108n and 110a, . . . , 110n of the ecosystem 100, a simplified, secured, real-time, and fail-safe tracking of the media content rights is ensured. In accordance with an embodiment, a media content right associated with a media content may be an electronic implementation of a legal contract designed to allow only authorized redistribution of the digital media content and restrict the ways the media content is consumed.

The plurality of nodes 102a, . . . , 102n may correspond to servers or services that may be configured to execute an implementation of the defined protocol for joining the communication network 106. In accordance with some embodiments, a node of the plurality of nodes 102a, . . . , 102n may include one or more software applications or code having instructions for defining rules for the programmatic implementation of the defined protocol. In accordance with other embodiments, a node of the plurality of nodes 102a, . . . , 102n may be a hardware device in which the software application is executed. The hardware device may be owned by an entity, for example, a gateway, a content owner or a content distributor. The plurality of nodes 102a, . . . , 102n may be further configured to maintain a copy of the distributed media rights transaction ledger 104 and may create, distribute, execute, and validate media content rights transactions on/from the communication network 106. Examples of the media content rights transactions may include, but are not limited to, an initial media content rights transaction, a new media content rights response transaction, and a media content rights transferal transaction. In accordance with an embodiment, each node of the plurality of nodes 102a, . . . , 102n may be further configured to maintain a corresponding instance of the distributed media rights transaction ledger 104 and communicate the corresponding instance of the distributed media rights transaction ledger 104 to the one or more remaining nodes upon request.

In an exemplary embodiment, a gateway node may correspond to the first gateway node 102a configured to issue the initial media content rights transaction. Further, a content distributor or a content owner may correspond to a second node 102n or other node 102c, respectively, configured to receive the initial media content rights transaction and issue a new media content rights response transaction based on verification, evaluation, and/or acceptance of a grant offer in the initial media content rights transaction issued by the first gateway node 102a.

At least one node of the plurality of nodes 102a, . . . , 102n, such as the second gateway node 102m and the second node 102n, a verifier node 102l, or a digital rights management (DRM) license node 102x may be configured to verify the one or more initial media content rights transactions of the plurality of media content rights transactions communicated by the one or more remaining nodes of the plurality of nodes 102a, . . . , 102n. In accordance with an embodiment, the verification may be based on verifying the identity and signature of a sender entity, such as the first initiating participant or the second initiating participant.

In accordance with an embodiment, the at least one node of the plurality of nodes 102a, . . . , 102n, such as the first nodes 102b or other node 102c, the verifier node (not shown), or the DRM license node 102x may be further configured to reject a set of invalid initial media content rights transactions from the plurality of media content rights transactions. In accordance with an embodiment, the rejection may be based on the un-verified identity and signature of the sender entity, such as the first initiating participant or the second initiating participant and/or when an offer from the sender entity is unsuccessfully validated and/or evaluated.

In accordance with an embodiment, each entity may dictate corresponding terms of agreement and/or contractual obligations for the media content owned by a content owner or distributed (or re-distributed) by a content distributor. The initial media content rights transaction, the new media content rights response transaction, and/or the media content rights transferal transaction may occur in a sequence, forming a chain of events. In some embodiments, the transferal for the media content rights may occur in the communication network 106, where each media content rights transferal transaction may be broadcasted to the entire communication network 106 (i.e., to all the nodes of the plurality of nodes 102a, . . . , 102n in the communication network 106). In other embodiments, the negotiations for the media content rights may be done mutually, where two or more nodes may communicate by issuing transactions directly to one another instead of broadcasting media content rights transferal transactions to the entire communication network 106. In this regard, one or more media content rights transferal transactions may be private transactions between two entities for which private channels may be created via nodes of the plurality of nodes 102a, . . . , 102n to communicate the private transactions between the two nodes associated with different participants. This type of media content rights transferal transaction may form a sister collection of media content rights transactions between the two entities. This may prevent excess traffic (distribution and validation of transactions) on the communication network 106 (of other nodes outside of the negotiation) and frees up other nodes to handle core traffic. However, every set of such mutual negotiations ends with one media content rights transferal transaction on the distributed media rights transaction ledger 104 that dictates an agreement such as a contract or other obligation between two or more entities over media content rights to agreed media content, such as one or more media assets, which may include some or all of the data referenced in the private transactions in a clear or encrypted form.

In accordance with an embodiment, at least one node of the plurality of nodes 102a, . . . , 102n may be further configured to determine (or discover) one or more new nodes which joined the communication network 106 within a defined time period, and communicate information associated with the plurality of nodes 102a, . . . , 102n to the one or more new nodes. Thus, each node may be further configured to communicate various media content rights transactions to other nodes, regardless of whether the media content rights transactions originate with the node or were communicated to it by other nodes. In this manner, any given media content rights transaction may be disseminated to all nodes on the communication network 106. The at least one node of the plurality of nodes 102a, . . . , 102n may be further configured to enforce an adherence of the plurality of nodes 102a, . . . , 102n to the protocol by refusing or accepting to communicate with the plurality of nodes 102a, . . . , 102n.

In accordance with an embodiment, a node, such as the first gateway node 102a, of the plurality of nodes 102a, . . . , 102n may be configured to act as an electronic gateway or a proxy for a consumer device, such as the first consumer device 114a, associated with a content consumer such as the first content consumer 110a, to connect with at least one node of the plurality of nodes 102a, . . . , 102n. In this regard, the node is accessible to consumer devices via an application programming interface (API) which allows the content consumers to interact with the communication network 106. The entity, such as the first initiating participant, that owns the gateway and acting on behalf of the content consumer, such as the first content consumer 110a, may transfer media content rights and gather metadata surrounding available media content. The purpose of a node proxying a content consumer, such as one content consumer of the plurality of content consumers 110a, . . . , 110n, to the communication network 106 allows rapid scaling of the number of content consumers without the need to scale the count or number of nodes.

Such node of the plurality of nodes 102a, . . . , 102n may be further configured to determine an identity of the content consumer from credentials of the content consumer. In accordance with an embodiment, the identity may be derived from a globally unique cryptographic identifier associated with the content consumer. The node may be further configured to determine that the content consumer exists in an alternate data store that is created based on at least a corresponding instance of the distributed media rights transaction ledger 104. The alternate data store may include a set of transactions of the plurality of media content rights transactions that correspond to records of a plurality of content consumers that joins the communication network 106 as new content consumers. The node may be configured to validate the content consumer based on the existence of the identity of the content consumer in the alternate data store.

In accordance with an embodiment, at least one node may be further configured to enforce a plurality of constraints associated with the one or more media content rights defined in or specified by at least one transaction for a participant to transfer or consume content associated with the one or more media content rights. In accordance with an embodiment, each node may represent at least one participant on the communication network 106 based on signed transactions originated from the node with a cryptographic signature of corresponding participant.

In accordance with an embodiment, a node of the plurality of nodes 102a, . . . , 102n may be configured to, and be responsible for communicating corresponding instance of the distributed media rights transaction ledger 104, to other requesting nodes in the communication network 106. Accordingly, a new node may be configured to share the same distributed media rights transaction ledger history with any or all other nodes as well, which allows auditing an instance of the distributed media rights transaction ledger associated with corresponding node. In other words, each node may append corresponding media content rights transactions, as well as media content rights transactions from other nodes in its own instance of the distributed media rights transaction ledger 104.

The distributed media rights transaction ledger 104 may correspond to a consensus of replicated, shared, and synchronized digital data, for example the plurality of media content rights transactions, geographically spread across multiple sites, countries, or institutions. The distributed media rights transaction ledger 104 has no central administrator or centralized data storage. Data integrity in the distributed media rights transaction ledger 104 may be secured by consensus across the sites in addition to cryptographic techniques.

In accordance with an embodiment, each instance of the distributed media rights transaction ledger 104 may include a plurality of media content rights transactions corresponding to accepted and transferred media content rights transactions, prior to the consumption of the media content at the first consumer device 114a.

In accordance with an embodiment, the distributed media rights transaction ledger 104 may include records of historical interactions in a time sequence related to flow or movement of media content rights from a content owner to a content distributor, or from a content distributor to another content distributor, or from a content owner or a content distributor to a content consumer in any arbitrary media content rights transaction. In some embodiments, in addition to media content rights, the distributed media rights transaction ledger 104 may include records of historical interactions in a time sequence of media consumption by content consumer and related data/analytics, content catalog information, and the like.

The communication network 106 may correspond to a collection of nodes, such as the plurality of nodes 102a, . . . , 102n, that interact with one another, perform broadcast media content rights transactions with respect to one another, and maintain a copy of the distributed media rights transaction ledger 104 to act as a common store of data. In accordance with various embodiments, the communication network 106 may be a peer-to peer network, a protocol network, a distributed communication network and/or the like. In accordance with other embodiments, the communication network 106 may comprise one or more of a cable television networks, the Internet, a satellite communication network, a wide area network (WAN), a medium area network (MAN), and a local area network (LAN). Although a communication network 106 is shown in FIG. 1, the disclosure is not limited in this regard; accordingly, other exemplary modes may comprise uni-directional or bi-directional distribution, such as packet-radio or satellite communication.

The plurality of participants 108a, . . . , 108n and 110a, . . . , 110n, may correspond to a group, an individual, or a company that may operate the plurality of nodes 102a, . . . , 102n in the communication network 106. A participant of the plurality of participants 108a, . . . , 108n and 110a, . . . , 110n, may act as an entity of a plurality of entities 108a, . . . , 108n or a content consumer of a plurality of content consumers 110a, . . . , 110n. Each participant of the plurality of participants 108a, . . . , 108n and 110a, . . . , 110n may interact within the communication network 106 by operating at least one node that adheres to the defined protocol within the communication network 106.

Each entity of the plurality of entities 108a, . . . , 108n may be configured to interact with the communication network 106 by operating at least one node in the communication network 106 which adheres to the defined protocol. An entity associated with a node of the plurality of nodes 102a, . . . , 102n may present metadata of a plurality of content libraries as a unified library. Another entity of the plurality of entities 108a, . . . , 108n may represent a content owner, a content distributor, or both. From the content owner, one or more media content rights associated with media content may be originated. The content owners may be responsible for issuing licenses for consumption of the media content by the content consumers. All media content, such as the media assets, may have only one content owner in perpetuity. Media content rights to the media content, such as the media assets, may be transferred and/or re-distributed in accordance with the permission of the content owner.

A content distributor of the plurality of entities 108a, . . . , 108n may acquire media content rights from another content owner or another content distributor and transfer and/or re-distribute the acquired media content rights to other content distributors and gateway nodes. In accordance with an embodiment, the content owner may own a given collection of media content rights to be sold, transferred, and/or distributed to content distributors and/or content consumers. When a content consumer is interacting with the communication network 106 through a node, which belongs to a given entity in the communication network 106, the content consumer may be considered to be owned by the given entity. Accordingly, the communication network 106 may be secured by ensuring that: a) content consumer transactions adhere to the protocol as enforced by the proxying/gateway node; b) the entity assumes responsibility over transactions requested by the content consumer; and c) another entity may request to validate the identity of a given user from a prior content owner using the distributed media rights transaction ledger 104.

On the other hand, the content consumer of the plurality of content consumers 110a, ..., 110n may be a user or an individual who may acquire media content rights via a gateway on the communication network 106. Accordingly, the content consumer may execute media content rights to acquire media content licenses to consume the media content. The content consumer may not have the capability to transfer and/or re-distribute the acquired media content rights. In accordance with an embodiment, the content consumer may require an entity (one of the content owner or the content distributor) as a proxy or a gateway to interact with the ecosystem 100 on behalf of the content consumer. Therefore, the content consumer may not be configured to operate any node of the plurality of nodes 102a, ..., 102n. The content consumer of the plurality of content consumers 110a, ..., 110n may be associated with a corresponding consumer device of the plurality of consumer devices 114a, ..., 114n. A given content consumer may be unique across the entire communication network 106, regardless of which entities the content consumer interacts with or belongs to, based, for example, on a subscription or membership.

In accordance with an embodiment, an entity, such as a content owner and/or a content distributor, may serve as a gateway for the plurality of content consumers 110a, ..., 110n and acts on the behalf of the plurality of content consumers 110a, ..., 110n. Further, the entity may acquire the media content rights to transfer the media content that it does not own to other content distributors and/or content consumers. In such a case, the entity may act on the behalf of the plurality of content consumers 110a, ..., 110n. In this regard, when a content consumer is proxied through an entity to the communication network 106, the entity may become an owner of the content consumer. A plurality of media content rights transactions makes up the core unit (or building block) of data that may be recorded into the distributed media rights transaction ledger 104 of the communication network 106. Each media content rights transaction of the plurality of media content rights transactions may act as a container for exchange of data across nodes among the plurality of nodes 102a, ..., 102n. The structure of each media content rights transaction and corresponding data payload may be specified by the defined protocol for a given context, such that the plurality of nodes 102a, ..., 102n in the communication network 106 may accept, reject, counter, validate, and parse the plurality of media content rights transactions in a deterministic and non-ambiguous manner. The plurality of media content rights transaction may be configured to define specialized exchange of data regarding the offer, the evaluation of the offer, a counteroffer, and/or acceptance of an offer to transfer media content rights. In accordance with an embodiment, for each transferal of media content rights, there is at least one asking entity, such as the initiating entity, and one accepting entity, such as the receiving entity. The initiating entity issue an initial media content rights transaction for other entities. The receiving entity is an entity that, in an embodiment, has agreed to the terms negotiated and issues a new media content rights response transaction based on the initial media content rights transaction. For example, a first content distributor entity 108b associated with the first node 102b may want to transfer media content rights, thus may issue the initiate media content rights transaction with a set of parameters for a second content distributor entity 108n associated with the second node 102n. In such a case, the first content distributor entity 108b may be the initiating entity. In cases, where the second content distribution entity 108m agrees to the set of parameters and issues the new media content rights response transaction, the second content distributor entity 108m becomes the receiving entity.

In an exemplary embodiment, a media content rights transaction begins with an "INITIATE" media content rights transaction that may signal the start of a transferal of media content rights between two or more entities. A "RESPONSE" new media content rights response transaction may be issued when an entity has countered (i.e. providing counter/alternative offer), accepted (with an acceptance response value) or rejected (with a reject response value) another entity's "INITIATE" media content rights negotiation. An "ACCEPT" media content rights transaction may occur when an entity has accepted the terms of the last "INITIATE" media content rights transaction. As per the protocol that dictates the rules of how the participants interact with each other as a standard, there can only be one "ACCEPT" transaction in a set of media content rights, and only at the end of the chain of media content rights transactions.

In accordance with an embodiment, every media content rights transaction for the media content rights may include an "ASK" data field. The "ASK" data field may further include one or more parameters governing the constraints of a contract between the participating entities. Such one or more parameters may be dictated by the protocol in definition or type, but not in value. For example, "PRICE" may be parameter defined in the rules of the protocol, but its value is only defined in any given media content rights transaction and may differ from transaction to transaction. Other parameters of the "ASK" data field may include, but are not limited to "DATE_RANGE", "CONTENT_ID", "GEOGRAPHICAL_PERMIT", "TIME_OF_DAY", and "DURATION." These parameters take on their named literal meaning.

Each media content rights transaction of the plurality of media content rights transactions may be created by a node, such as the first gateway node 102a, of the plurality of nodes 102a, ..., 102n, and recorded into corresponding instances of the distributed media rights transaction ledger 104, when accepted. Further, the media content rights transaction of the plurality of media content rights transactions may be communicated to other nodes to be rejected, countered, dismissed, or validated, and when accepted, may be recorded into corresponding instances of the distributed media rights transaction ledger 104 maintained at respective nodes of the plurality of nodes 102a, ..., 102n. The data traffic created by the plurality of media content rights transactions between the nodes of the plurality of nodes 102a, ..., 102n is what defines the ecosystem 100 or the marketplace of media content rights. Each of the plurality of media content rights transactions may be categorized and specified by the defined protocol. Each media content rights transaction may include the category of: a) an announcement of a newly created entity; b) an announcement of a newly created content consumer; c) an announcement of newly available media content, such as a media asset; d) a transferal of media content rights of media content (as a result of negotiations); and e) consumption of the media content by a content consumer.

In accordance with various embodiments, each of the plurality of media content rights transactions may be configured to define the transferal and execution of media content rights. Each of the plurality of media content rights transactions may be stored in the distributed media rights transaction ledger 104 to serve as a history of interactions between various entities. Each of the plurality of media content rights transactions originate from a node of the plurality of nodes 102a, . . . , 102n, and must be distributed to all nodes within the communication network 106 for validation and synchronization. Each of the plurality of media content rights transactions may comprise an initiating node's entity's cryptographic signature, a recipient entity's cryptographic identity, and identity of one or more media content rights for a given media content, negotiated terms of one or more media content rights, an identity of a content consumer, and disparate data associated with consumption of media content by a content consumer.

Each of the plurality of new media content rights response transactions with an acceptance response value may further comprise an encrypted summary of a set of media content rights transactions, one or more cryptographic hashes of historic media content rights transactions from the distributed media rights transaction ledger 104 for linking one media content rights transaction to another, and a cryptographic hash of all data comprising the media content rights transaction. Each of the plurality of media content rights transactions may further comprise a descriptor for the intent of the media content rights transaction, which may further include at least granted media content rights after a transferal of a media content right, and intent to begin initiate media content rights transactions with another entity, grant of a media content right, consumption of media content by a content consumer, and registration of the plurality of participants 108a, . . . , 108n, and 110a, . . . , 110n.

In accordance with an embodiment, in a case where a media content rights transaction is found to be invalid by most nodes in the communication network 106, the media content rights transaction may be discarded and not appended to the distributed media rights transaction ledger 104 across all nodes of the plurality of nodes 102a, . . . , 102n. There may be an exception, where such invalid media content rights transactions may be added to the distributed media rights transaction ledger 104, but remain invalid, to serve as a history of the origin of invalid media content rights transactions. Such a history may serve as a mechanism to audit potential attacks on the communication network 106 during auditing.

The network 116 may be any kind of network, or a combination of various networks, and it is shown illustrating the communication that may occur between the plurality of consumer devices 114a, . . . , 114n and the distributed communication network 106. For example, the communication network 106 may comprise one or more of a cable television networks, the Internet, a satellite communication network, a wide area network (WAN), a medium area network (MAN), and a local area network (LAN). Although the network 116 is shown, the disclosure is not limited in this regard, accordingly, other exemplary modes may comprise uni-directional or bi-directional distribution, such as packet-radio and satellite.

In operation, in various aspects of the disclosure, the media content rights transferal may occur between one of a first gateway node 102a or a first node 102b associated with one of a first initiating participant or a second initiating participant respectively, and one of the second gateway node 102m or the second node 102n associated with the first and the second receiving participant, respectively. The media content rights transferal may be based on a protocol for management of media content rights using a distributed media rights transaction ledger 104 in the ecosystem 100 of FIG. 1.

Figure 2A:
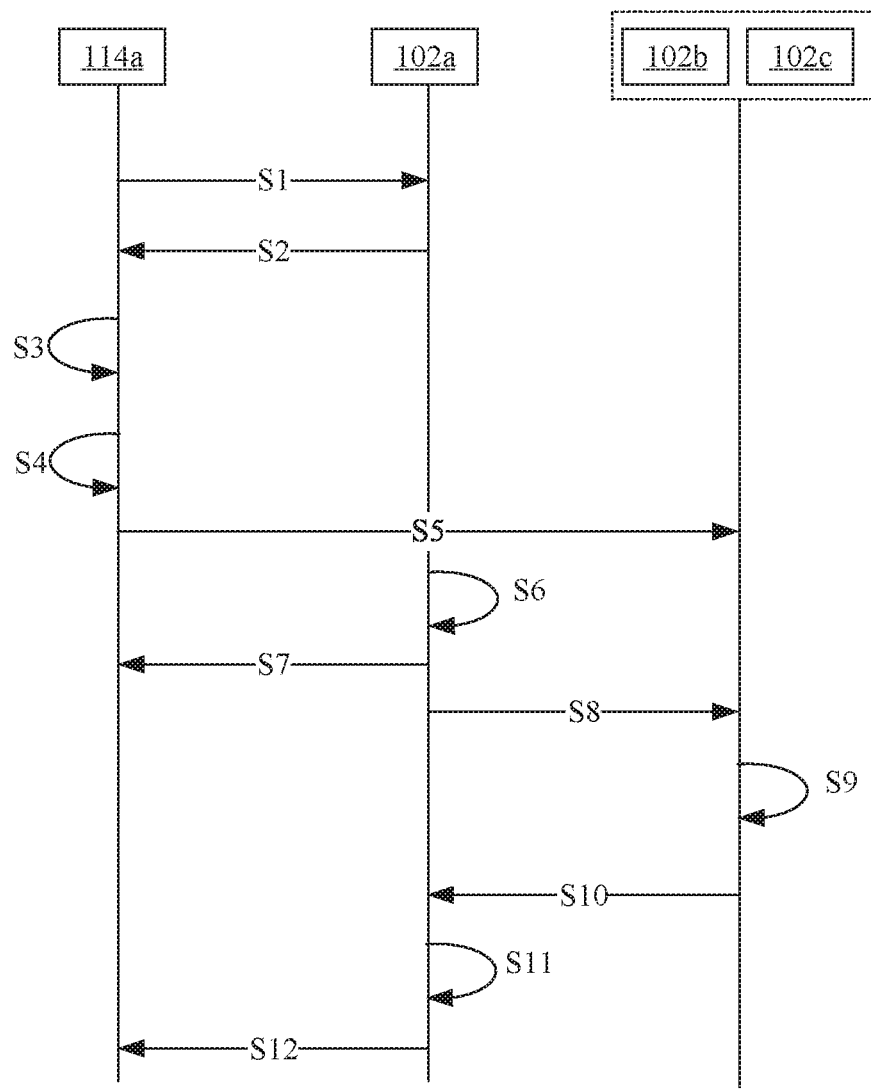
FIGS. 2A to 2C depict message flow diagrams illustrating exemplary message flows for media content rights transferal based on a protocol for management of media content rights using a distributed media rights transaction ledger in the ecosystem 100 of FIG. 1, in accordance with an exemplary embodiment of the disclosure.

Media Content Rights Transferal Between the First Initiating Participant and the First Receiving Participant or the Second Receiving Participant The first consumer device 114a associated with the first initiating participant, such as first content consumer 110a, may be configured to connect to the first gateway node 102a, as depicted by S1 in FIG. 2A. The first consumer device 114a associated with the first initiating participant, such as first content consumer 110a, may be configured to retrieve the set of media content for which the media content rights are secured from the associated instance of distributed media rights transaction ledger 104, as depicted by S2 in FIG. 2A.

The first consumer device 114a associated with the first initiating participant, such as first content consumer 110a, may be further configured to present the retrieved set of media content for which the media content rights are secured on the first consumer device 114a associated with the first initiating participant, such as the first content consumer 110a, as depicted by S3 in FIG. 2A. The media content rights may correspond to one or more of playback media content rights, download media content rights, download media content rights, or transferal media content rights.

The first initiating participant, such as first content consumer 110a, may be further configured to select one of the retrieved set of media content presented on the first consumer device 114a, as depicted by S4 in FIG. 2A. Thereafter, the first initiating participant, such as first content consumer 110a, may be configured to issue the request for the transferal of the media content rights of the media content to one of the first receiving participant, such as the second content consumer 110n, or the second receiving participant, such as the second content distributor entity 108n, as depicted by S5 in FIG. 2A. The request for the transferal of the media content rights issued to the first gateway node 102a may comprise at least identifiers associated with one of the first initiating participant or the second initiating participant, the media content, a respective owner of the media content transferal rights, the first receiving participant and the second receiving participant retrieved from the distributed media rights transaction ledger 104.

Thereafter, the first gateway node 102a associated with the first content consumer 110a or the first content distributor entity 108b may be configured to traverse the associated instance of the distributed media rights transaction ledger 104 to determine that the first initiating participant, such as the first content consumer 110a, has active media content rights. Alternatively, the associated instance of the distributed media rights transaction ledger 104 may be traversed to determine that one of the first initiating participant, such as the first content consumer 110a, or the second initiating participant, such as the first content distributor entity 108b, has permission to transfer the media content rights for the media content based on the set of associated constraints, as depicted by S6 in FIG. 2A.

The first gateway node 102a associated with the first content consumer 110a or the first content distributor entity 108b may be further configured to search for the media content rights transaction associated with identifiers retrieved from the distributed media rights transaction ledger 104, as depicted by S6 in FIG. 2A. Accordingly, it may be determined that the first initiating participant, such as the first content consumer 110a, has active media content rights.

In accordance with an embodiment, the first gateway node 102a may be configured to present the set of associated constraints of the media content rights transferal associated with one of the first receiving participant, such as the second content consumer 110n, or the second receiving participant, such as the second content distributor entity 108n, to the one of the first initiating participant or the second initiating participant, as depicted by S7 in FIG. 2A.

The first gateway node 102a may be further configured to traverse the distributed media rights transaction ledger 104 to determine an address of one of the second gateway node 102m or the second node 102n associated with at least the identifier of one of the first receiving participant or the second receiving participant based on an acceptance of the set of associated constraints by one of the first initiating participant or the second initiating participant. Accordingly, one of the first gateway node 102a or the first node 102b associated with one of the first initiating participant or the second initiating participant, respectively, may be configured to issue the initial media content rights transaction, which includes at least a transaction identifier that indicates grant offer for transferal of media content rights, to one of the second gateway node 102m or the second node 102n, as depicted by S8 in FIG. 2A.

Based on the received initial media content rights transaction, one of the second gateway node 102m or the second node 102n, may be configured to validate authenticity of the request for the transferal of the media content rights based on verification of cryptographic signature of one of the first initiating participant or the second initiating participant. One of the second gateway node 102m or the second node 102n, may be further configured to validate that one of the first receiving participant and the second receiving participant can accept the request for the transferal of the media content rights based on a confirmation that the set of associated constraints is non-conflicting against one of the first initiating participant or the second initiating participant, as depicted by S9 in FIG. 2A.

One of the second gateway node 102m associated with the first receiving participant or the second node 102n associated with the second receiving participant may be configured to issue a new media content rights response transaction based on verification, evaluation, and/or acceptance of the grant offer in the initial media content rights transaction, as depicted by S10 in FIG. 2A.

One of the first gateway node 102a or the first node 102b associated with one of the first initiating participant or the second initiating participant, respectively, may be configured to receive the new media content rights response transaction from one of the second gateway node 102m or the second node 102n, based on verification, evaluation, and/or acceptance of a grant offer in the initial media content rights transaction. One of the first gateway node 102a or the first node 102b associated with one of the first initiating participant or the second initiating participant, respectively, may be further configured to validate the authenticity of the request for the transferal of media content rights based on verification of cryptographic signature of one of the first initiating participant or the second initiating participant, as depicted by S11 in FIG. 2A.

One of the first gateway node 102a or the first node 102b associated with one of the first initiating participant or the second initiating participant, respectively, may be further configured to analyze the new media content rights response transaction, as depicted by S11 in FIG. 2A.

Based on the analysis, in an embodiment, one of the first gateway node 102a or the first node 102b associated with one of the first initiating participant or the second initiating participant, respectively, may determine a reject response value in the new media content rights response transaction. In another embodiment, one of the first gateway node 102a or the first node 102b associated with one of the first initiating participant or the second initiating participant, respectively, may determine an acceptance response value in the new media content rights response transaction. In another embodiment, one of the first gateway node 102a or the first node 102b associated with one of the first initiating participant or the second initiating participant, respectively, may determine a counteroffer in the new media content rights response transaction.

Accordingly, one of the first gateway node 102a or the first node 102b associated with one of the first initiating participant or the second initiating participant, respectively, may inform the first consumer device 114a that the media content rights transferal is declined, as depicted by S12 in FIG. 2A. Further, one of the first gateway node 102a or the first node 102b associated with one of the first initiating participant or the second initiating participant, respectively, may be configured to append the new media content rights response transaction data to the associated instance of the distributed media rights transaction ledger 104. The appended new media content rights response transaction data may be broadcasted to the plurality of nodes 102a, . . . , 102n on the communication network 106. Accordingly, the first consumer device 114a may be informed that the media content rights transferal is accepted in accordance with the set of constraints, as depicted by S12 in FIG. 2A. In another embodiment, one of the first gateway node 102a or the first node 102b associated with one of the first initiating participant or the second initiating participant, respectively, may receive the counter transaction as the new media content rights response transaction, and control passes back to S6 to iteratively execute the exemplary steps S6 to S12.

Media Content Rights Transferal Between the Second Initiating Participant and the First Receiving Participant In accordance with another aspect of the disclosure, the first node 102b associated with the second initiating participant, such as the first content distributor entity 108b, may be configured to receive the request that is external to the first or the second receiving participant. Such direct or external request may comprise information associated with one of the first initiating participant or the second initiating participant, the media content, and an owner of the media content transferal rights, based on the associated instance of the distributed media rights transaction ledger 104.

Figure 2B:
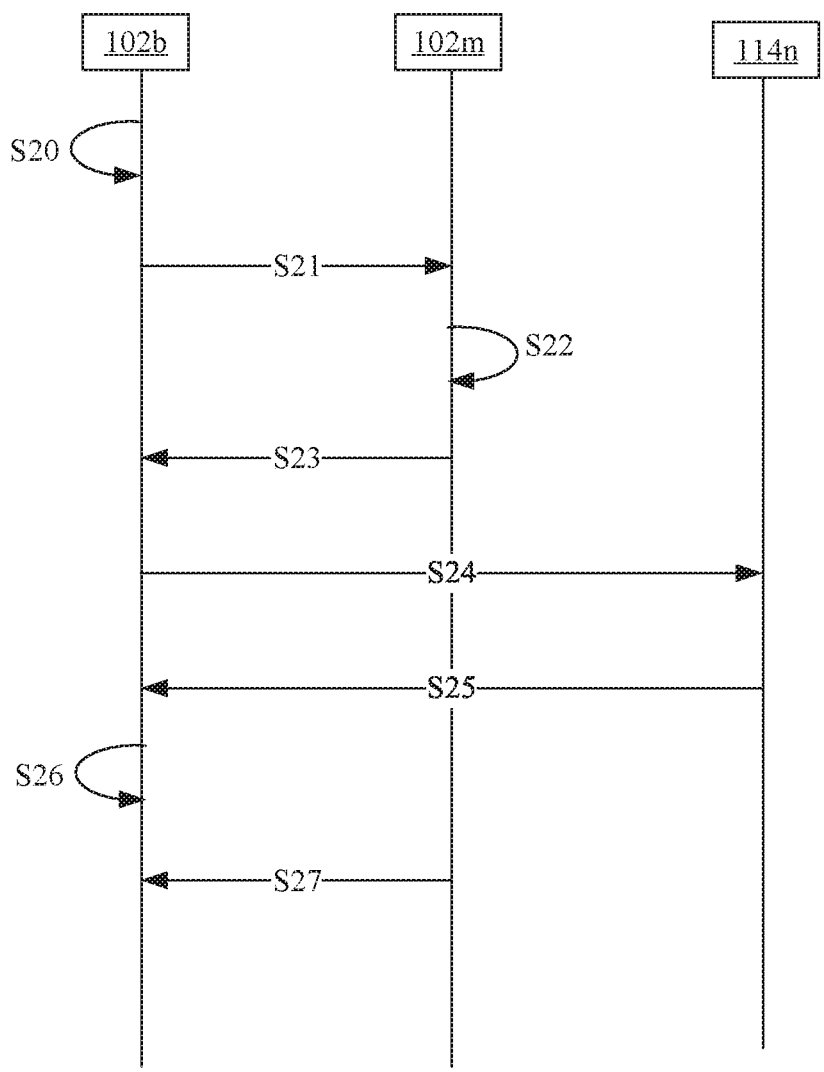

As depicted by S20 in FIG. 2B, the first node 102b associated with the second initiating participant, such as the first content distributor entity 108b, may be configured to search for the media content rights transaction associated with the media content or identifier of the owner of the media content transferal rights retrieved from the distributed media rights transaction ledger 104 for the determination that the second initiating participant has active media content rights.

In accordance with an embodiment, the first node 102b associated with the second initiating participant may be configured to determine that the first node 102b associated with the second initiating participant, such as the first content distributor entity 108b, is permitted to transfer media content rights for selected media content per set of associated constraints. The set of associated constraints may be defined by a set of negotiated media content rights. The set of associated constraints may comprise at least a time duration for a length or period of the transferal of the media content rights, one or more restrictions associated with the first receiving participant, a download or offline access, a condition whether one of the first initiating participant or the second initiating participant and the first receiving participant can leverage the media content simultaneously or if mutually exclusive media content rights transferal is permitted where only one of the first initiating participant or the second initiating participant and the first receiving participant can leverage the media content at a given time, playback frequency limits, and restrictions and quality level related to a second consumer device 114*n*.

Accordingly, the first node 102*b* associated with the second initiating participant, such as the first content distributor entity 108*b*, may be configured to distribute the request for the transferal of the media content rights to one or more nodes of the plurality of nodes 102*a*, . . . , 102*n* associated with the second initiating participant when the first node 102*b* fails to process the request.

Further, the distributed media rights transaction ledger 104 may be traversed to determine an address of at least a second gateway node 102*m* associated with at least an identifier of one of first receiving participant or second receiving participant based on acceptance of a set of associated constraints by the second initiating participant.

Accordingly, the first node 102*b* associated with the second initiating participant, such as the first content distributor entity 108*b*, may be configured to issue the initial media content rights transaction, which includes at least a transaction identifier that indicates a grant offer for transferal of media content rights, to the second gateway node 102*m*, as depicted by S21 in FIG. 2B.

The initial media content rights transaction may further include identifiers associated with one or more of the first initiating participant or the second initiating participant, the media content, media content transferal rights owner, the first receiving participant or the second receiving participant, parameters associated with a specific media content rights transferal, a cryptographic identifier of media content rights transaction data that can be referenced by another media content rights transaction, cryptographically signed by the first initiating participant or the second initiating participant.

Based on the received initial media content rights transaction, the second gateway node 102*m* associated with the first receiving participant, may be configured to validate authenticity of the request for the transferal of the media content rights based on verification of cryptographic signature of one of the first initiating participant. The second gateway node 102*m* associated with the first receiving participant, may be further configured to validate that one of the first receiving participant or the second receiving participant can accept the request for the transferal of the media content rights based on a confirmation that the set of associated constraints is non-conflicting against the second initiating participant, as depicted by S22 in FIG. 2B.

Accordingly, the second gateway node 102*m* may issue a new media content rights response transaction for the first node 102*b* associated with the second initiating participant, such as the first content distributor entity 108*b*, based on the verification, evaluation, and/or acceptance of grant offer in initial media content rights transaction, as depicted by S23 in FIG. 2B.

In response, the first node 102*b* associated with the second initiating participant, such as the first content distributor entity 108*b*, may be configured to present one or more options to the first receiving participant, such as the second content consumer 110*n*, to respond to the issued new media content rights transaction, as depicted by S24 in FIG. 2B. The response of the first receiving participant, such as the second content consumer 110*n*, may be transmitted back to the first node 102*b*, as depicted by S25 in FIG. 2B. The one or more options for the issued new media content rights transaction may be one of an acceptance, a rejection or a counter of the grant offer for the transferal of the media content rights.

The first node 102*b* associated with the second initiating participant, such as the first content distributor entity 108*b*, may be configured to analyze the option selected by the first receiving participant, as depicted by S26 in FIG. 2B.

Accordingly, based on the selected option, the second gateway node 102*m* may be configured to issue a rejection, accept or counter media content rights transaction as the new media content rights response transaction to the first node 102*b* associated with the second initiating participant, as depicted by S27 in FIG. 2B.

In accordance with an embodiment, when the option selected by the first receiving participant is a rejection of the grant offer for the transferal of the media content rights, the first node 102*b* associated with the second initiating participant, such as the first content distributor entity 108*b*, may be configured to receive a rejection media content rights transaction as the new media content rights response transaction from the second gateway node 102*m*. Accordingly, negotiation with the first receiving participant for the transferal of the media content rights may be ceased.

In accordance with an embodiment, when the option selected by the first receiving participant is an acceptance of the grant offer for the transferal of the media content rights, the first node 102*b* associated with the second initiating participant, such as the first content distributor entity 108*b*, may be configured to receive an accept media content rights transaction as the new media content rights response transaction from the second gateway node 102*m*. Accordingly, the new media content rights response transaction data may be broadcasted to the plurality of nodes 102*a*, . . . , 102*n* in the communication network 106, and appended in the plurality of instances of the distributed media rights transaction ledger 104 associated with the respective node of the plurality of nodes 102*a*, . . . , 102*n*.

In accordance with an embodiment, when the option selected by the first receiving participant is a counter of the grant offer (to provide an alternative offer) for the transferal of the media content rights, the first node 102*b* associated with the second initiating participant, such as the first content distributor entity 108*b*, may be configured to receive the counter media content rights transaction as the new media content rights response transaction from the second gateway node 102*m*.

Media Content Rights Transferal Between the Second Initiating Participant and the Second Receiving Participant In accordance with another aspect of the disclosure, the second initiating participant, such as the first content distributor entity 108*b* or a content owner 108*c*, may be configured to determine a requirement for the transferal of the media content rights for redistribution of the media content. The determination of the transferal requirement and/or the received request for the transferal of the media content rights is based on information associated with various sources, as described, for example, in FIGS. 4F and 4G.

Figure 2C:
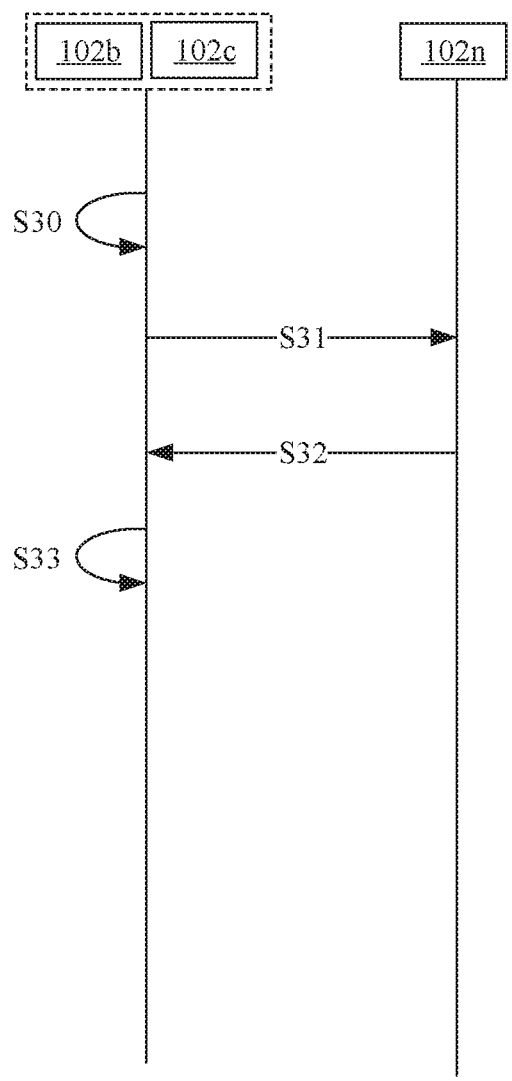

In accordance with an embodiment, the second initiating participant, such as the first content distributor entity 108*b* or a content owner 108*c*, may be configured to traverse the associated instance of the distributed media rights transaction ledger 104 to determine an address of the second node 102*n* associated with an identifier of one of the second receiving participant, such as the second content distributor entity 108*n* or a second content owner (not shown), as depicted by S30 in FIG. 2C.

The second initiating participant, such as the first content distributor entity 108*b* or a content owner 108*c*, may be configured to issue the initial media content rights transaction to the second node 102*n* associated with an identifier of one of the second receiving participant, such as the second content distributor entity 108*n* or a second content owner (not shown), as depicted by S31 in FIG. 2C.

In accordance with an embodiment, for the issuance of the new media content rights response transaction, the second node 102*n* associated with the second receiving participant, such as the second content distributor entity 108*n*, may be configured to determine the new media content rights response transaction. The new media content rights response transaction may be determined based on a verification, evaluation, and/or acceptance of the grant offer, upon a receipt of the initial media content rights transaction issued by the second initiating participant, such as the first content distributor entity 108*b*. In other words, the second node 102*n* associated with the second receiving participant, such as the second content distributor entity 108*n*, may validate the origin of the new media content rights response transaction by verifying the identity and signature of the first node 102*b* associated with the second initiating participant, such as the first content distributor entity 108*b*. The second receiving participant, such as the second content distributor entity 108*n*, may further evaluate the grant offer and determine the acceptance, rejection, or a counteroffer for the grant. The latter may be referred to as countering the grant offer. Accordingly, the new media content rights response transaction issued by the second receiving participant, such as the second content distributor entity 108*n*, may one of a media content rights accept transaction, a media content rights reject transaction, or a media content rights counter transaction, as depicted by S32 in FIG. 2C.

In an embodiment, the second receiving participant, such as the second content distributor entity 108*n*, may reject the grant offer for the transferal of the media content rights. Accordingly, the second receiving participant, such as the second content distributor entity 108*n*, may be configured to issue a rejection media content rights transaction as the new media content rights response transaction to the first node 102*b* associated with the second initiating participant, such as the second content distributor entity 108*n*.

In another embodiment, the second receiving participant, such as the second content distributor entity 108*n*, may accept the grant offer for the transferal of the media content rights. Accordingly, the second receiving participant, such as the second content distributor entity 108*n*, may be configured to issue an accept media content rights transaction as the new media content rights response transaction to the first node 102*b* associated with the second initiating participant, such as the second content distributor entity 108*n*.

In another embodiment, the second receiving participant, such as the second content distributor entity 108*n*, may counter the grant offer for the transferal of the media content rights. Accordingly, the second receiving participant, such as the second content distributor entity 108*n*, may be configured to issue a counter media content rights transaction as the new media content rights response transaction to the first node 102*b* associated with the second initiating participant, such as the second content distributor entity 108*n*.

In accordance with an embodiment, the first node 102*b* associated with the second initiating participant, such as the first content distributor entity 108*b*, may be configured to receive the new media content rights response transaction from the second receiving participant, such as the second content distributor entity 108*n*.

Accordingly, the first node 102*b* associated with the second initiating participant, such as the first content distributor entity 108*b*, may be configured to analyze the new media content rights response transaction. Based on the analysis, in an embodiment, the first node 102*b* associated with the second initiating participant, such as the first content distributor entity 108*b*, may be configured to determine a reject, acceptance or counter response value in the new media content rights response transaction.

In accordance with an embodiment, based on the media content rights reject transaction issued by the second node 102*n* associated with the second receiving participant, the first node 102*b* associated with the second initiating participant, such as the first content distributor entity 108*b*, may be configured to cease to negotiate with the second node 102*n* associated with the second receiving participant for the current session, and negotiation with nodes associated with participants other than the first node 102*b* may be initiated.

In accordance with an embodiment, based on the media content rights accept transaction issued by the second node associated with the second receiving participant, the first node 102*b* associated with the second initiating participant, such as the first content distributor entity 108*b*, may be further configured to issue reject media content rights response transaction to one or more nodes other than the second receiving participant for current session. Further, the new media content rights response transaction may be broadcasted to the plurality of nodes 102*a*, . . . , 102*n* in the communication network 106. Furthermore, the new media content rights response transaction data may be appended to the plurality of instances of the distributed media rights transaction ledger 104 associated with respective node of the plurality of nodes 102*a*, . . . , 102*n*.

In accordance with an embodiment, the first node 102*b* associated with the second initiating participant, such as the first content distributor entity 108*b*, may be further configured to receive the media content rights counter transaction, which comprises the alternative offer, as the new media content rights response transaction to the first node 102*b* associated with the second initiating participant. The alternative grant offer may comprise at least supplemental media content rights, monetary value, a trade for existing media content rights, and/or statistical data. Accordingly, an accept, reject, or counter may be chosen in response to the media content rights counter transaction received from the second node 102*n* associated with the second receiving participant, as depicted by S33 in FIG. 2C.

Figure 3:
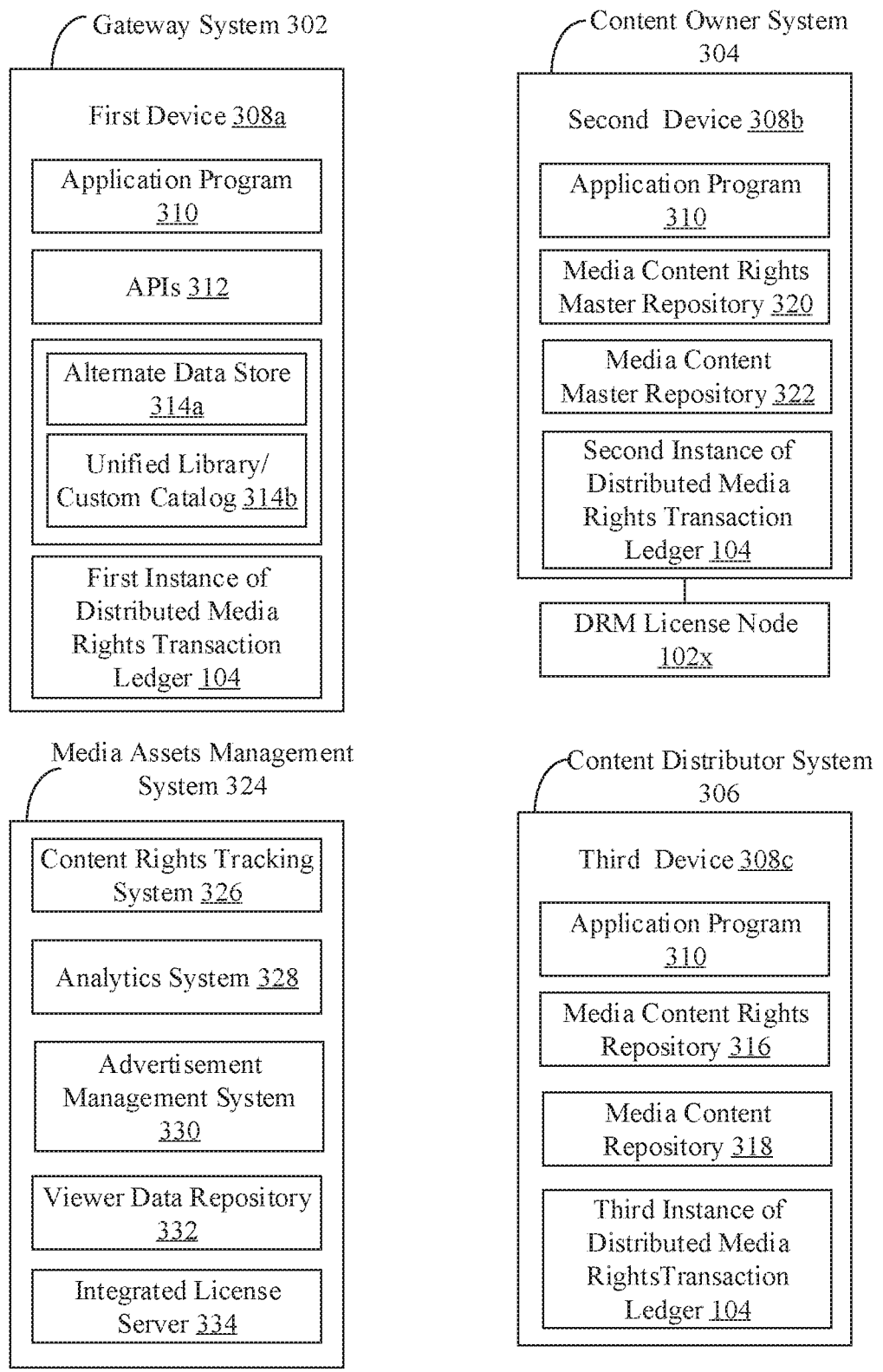
FIG. 3 depicts exemplary block diagrams for various systems of a distributed communication network 106 in the ecosystem 100 of FIG. 1, in accordance with an exemplary embodiment of the disclosure.

FIG. 3 depicts exemplary block diagrams for various systems of a distributed communication network 106 in the ecosystem 100 of FIG. 1, in accordance with an exemplary embodiment of the disclosure. With reference to FIG. 3, there are shown a gateway system 302, a content distributor system 306, a content owner system 304, and a media assets management system 324. The gateway system 302 may correspond to the first gateway node 102*a* and the second gateway node 102*m* of the plurality of nodes 102*a*, . . . , 102*n*, belonging to a first initiating entity and a first receiving entity, respectively, as described in FIG. 1. Similarly, the content distributor system 306 may correspond to the first node 102b and the second node 102n of the plurality of nodes 102a, . . . , 102n, belonging to an initiating entity and a receiving entity, respectively, as described in FIG. 1. The media assets management system 324 may correspond to an arbitrary node of the plurality of nodes 102a, . . . , 102n.

The gateway system 302 may include a first device 308a, an application program 310, APIs 312, an alternate data store 314a, a unified library/custom catalog 314b, and a first instance of distributed media rights transaction ledger 104. The content owner system 304 may include a second device 308b, the application program 310, a media content rights master repository 320, a media content master repository 322, and a second instance of distributed media rights transaction ledger 104. The content owner system 304 is shown to be associated with a DRM license node 102x. The content distributor system 306 may include a third device 308c, the application program 310, a media content rights repository 316, a media content repository 318, and a third instance of distributed media rights transaction ledger 104.

The media assets management system 324 may include a content rights tracking system 326, an analytics system 328, an advertisement management system 330, a viewer data repository 332, and an integrated license server 334. In some embodiments of the disclosure, the content rights tracking system 326, the analytics system 328, the advertisement management system 330, the viewer data repository 332, and the integrated license server 334 may be integrated to form a single integrated system. In other embodiments of the disclosure, the various systems may be distinct. Other separation and/or combination of the various entities of the exemplary media assets management system 324 illustrated in FIG. 3 may be done without departing from the scope of the various embodiments of the disclosure.

The gateway system 302 may comprise suitable logic, circuitry, and interfaces that may be configured to execute code that is accessible to the plurality of consumer devices 114a, . . . , 114n via the APIs 312. The APIs 312 allow content consumers 110a, . . . , 110n to interact with the plurality of nodes 102a, . . . , 102n in the communication network 106, with an entity, such as a streaming media and VOD service provider or a direct broadcast satellite service provider, that owns the gateway system 302 acting on behalf of the plurality of consumer devices 114a, . . . , 114n. The interaction may result in transferal of media content rights to and from other entities, such as content distributor system 306, for the plurality of consumer devices 114a, . . . , 114n.

The first device 308a may be owned by the gateway system 302 (such as the first gateway node 102a or the second gateway node 102m) and configured to store the application program 310, the APIs 312, and the first instance of distributed media rights transaction ledger 104. The first device 308a may be further configured to store or reference the alternate data store 314a and the unified library/custom catalog 314b. The alternate data store 314a may include a plurality of unique identities which may be represented as a cryptographic value corresponding to each valid content consumer. The alternate data store 314a may be created using at least the distributed media rights transaction ledger 104, in which each new content consumer joining the communication network 106 is recorded as a media content rights transaction. A requesting content consumer is validated in case the identity which may be represented as a cryptographic value of the requesting content consumer is found in the alternate data store 314a based on a match of the identity hash value with one of the plurality of unique identifiers stored in the alternate data store 314a or the first instance of distributed media rights transaction ledger 104.

The gateway system 302 may be configured to present metadata of multiple content libraries that may be owned by different entities, for example, different content owners, distributors, re-distributors, VOD service providers, and the like, as the unified library/custom catalog 314b for the content consumers 110a, . . . , 110n, to navigate. In this regard, the unified library/custom catalog 314b may correspond to a collection of media content belonging to one or more entities having media content rights available for transferal, distribution, and/or consumption. Further, the unified library/custom catalog 314b may be identified prepared and presented on-the-fly specifically for a content consumer, such as the first content consumer 110a, based on consumer behavior and consumption pattern of the first content consumer 110a, for playback.

Currently due to isolated content libraries and different subscriber base, a narrow view of content consumers related to media consumption pattern is available. The gateway system 302 may solve this problem by presenting metadata of multiple content libraries as the unified library/custom catalog 314b. Based on the communication network 106, an industry-wide network and ecosystem 100 is created, where an industry-wide single sign-on for the content consumers 110a, . . . , 110n, may be provided by the gateway system 302 to navigate through an industry-wide shared content library, where media content rights to a media content may be dynamically transferred, distributed, and enforced, by way of media content rights transactions. Thus, previously untapped markets may be identified, and un-monetized media content may be monetized by dynamic provisioning of media content rights to an accepting entity. In accordance with an embodiment, the gateway system 302 may also include the first instance of the distributed media rights transaction ledger 104, and thus may also function as a node. This node or another node associated with the same entity (e.g., a service provider that controls or owns the gateway system 302) may be required to update corresponding distributed media rights transaction ledger 104, in accordance with the media content rights transactions proxied for each content consumer (i.e., playback of requested media contents, ad plays, content requests, and the like). Such update may be broadcasted to other connected nodes of the plurality of nodes 102a, . . . , 102n for synchronization of the recently updated media content rights transaction in the distributed media rights transaction ledger 104 across the plurality of nodes 102a, . . . , 102n.

The content owner system 304 may comprise suitable logic, circuitry, and interfaces that may be configured to execute code to control and/or manage ownership of a collection of media content rights to be sold and/or distributed to content distributors, such as the first node 102b, and/or content consumers, such as the plurality of content consumers 110a, . . . , 110n. The content owner system 304 may be further configured to issue licenses to such content consumers for consumption of the media content. As illustrated in FIG. 3, the content owner system 304 may own the second device 308b that may be configured to store the application program 310, the second instance of the distributed media rights transaction ledger 104, the media content rights master repository 320, and the media content master repository 322. The media content master repository 322 may be a database of media content or media assets that are owned by the content owner system 304. The media assets may include uncompressed content, live content segments of one or more live feeds of channels, and/or VOD content.

Generally, the term "content," "media," "media assets" and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The media content rights master repository 320 may be a database of media content rights associated with the media content, available for negotiation. A media content right may be an electronic implementation of a legal contract designed to allow only authorized redistribution of digital media content and restrict the ways the media content is consumed.

The DRM license node 102x may correspond to a DRM license server for media content (that belongs to the content owner system 304) stored in the media content master repository 322. Metadata necessary to acquire a license from the DRM license node 102x associated with the content owner system 304, may include, but is not limited to, a distributed media rights transaction ledger identifier representing a media content, a distributed media rights transaction ledger identifier of an entity (for example the gateway system 302) facilitating the consumption of playback, and a distributed media rights transaction ledger identifier representing a content consumer. Such identifiers may be encrypted and hashed by the entity facilitating the consumption of playback, creating a cryptographic signature which may be used to validate the origin of the request.

The content distributor system 306 may comprise suitable logic, circuitry, and interfaces that may be configured to execute code to transfer media content rights of the media content (that it does not own) to other content distributors and/or content consumers. In accordance with an embodiment, the content distributor system 306 may act on the content consumer's behalf. In accordance with an embodiment, the content distributor system 306 may also act as a content owner, in tandem. As illustrated in FIG. 3, the content distributor system 306 may own the third device 308c that may be configured to store the application program 310, the third instance of the distributed media rights transaction ledger 104, the media content rights repository 316, and the media content repository 318.

The media assets management system 324 may comprise suitable logic, circuitry, and interfaces that may be configured to execute code for being owned or managed by an entity and may operate at least one node of the plurality of nodes 102a, . . . , 102n. In some embodiments, the media assets management system 324 may be jointly owned or managed by a group of entities in one country or multiple countries, where each entity operates at least one node of the plurality of nodes 102a, . . . , 102n. In some embodiments, the media assets management system 324 may be a public and open system, services of which may be partially or completely available to all the nodes of the plurality of nodes 102a, . . . , 102n in the communication network 106.

The content rights tracking system 326 may comprise suitable logic, circuitry, and interfaces that may be configured to execute code for tracking the media content rights or the flow of the media content rights of media content among various participants of the communication network 106 using the distributed media rights transaction ledger 104 maintained at each node. The content rights tracking system 326 increases operational efficiencies in the digital media and television content processing and digital rights management by allowing on-the-fly tracking of the media content rights or the flow of the media content rights of media content among various participants of the communication network 106 using the distributed media rights transaction ledger 104.

The analytics system 328 may comprise suitable logic, circuitry, and interfaces that may be configured to execute code for identifying (on-the-fly) a custom catalog specifically for a content consumer, such as the first content consumer 110a. The analytics system 328 may be further configured to prepare the custom catalog, and make available to the first content consumer 110a, via the gateway system 302. In some embodiments, the analytics system 328 may be configured to communicate the identified custom catalog to a particular node of an entity or a set of nodes of different entities subscribed to services of the analytics system 328. Thereafter, a scheduler system (not shown) of at least one node may be configured to prepare the custom catalog and make available to the first content consumer 110a. Similar to the first content consumer 110a, based on behavior and consumption pattern of the plurality of content consumers 110a, . . . , 110n, a custom catalog comprising selected media content, may be identified, prepared, and presented to each of the plurality of content consumers 110a, . . . , 110n on respective plurality of consumer devices 114a, . . . , 114n for media consumption.

The advertisement management system 330 may comprise suitable logic, circuitry, and interfaces that may be configured to execute code for dynamic insertion of pre-encoded VOD assets, or advertisement media, or other promotional media based on real-time data of media consumption of a particular media asset via the gateway system 302. The real-time data of media consumption may be received when a transaction related to the media consumption of media content is detected for a content consumer. In some embodiments, the advertisement media item (i.e., an ad) may be dynamically inserted at a specified position in the media asset associated with a detected content placement opportunity (CPO). The insertion may be done based on presence of an inbound trigger, such as society of cable telecommunication engineers (SCTE)-104/35-based trigger, at the specified position associated with the detected CPO. The manipulation of the catalogs or programming schedules may be driven by real time or near-real time change in user consumption behavior (that governs demand for particular type of content).

The viewer data repository 332 may comprise suitable logic, circuitry, and interfaces that may be configured to execute code for storing an industry-wide user behavioral data for the digital media and television content industry. The viewer data repository 332 may include individual consumer-based information and aggregate audience-based information. The individual consumer-based information may include parameters, such as favorite media assets, most preferred genre of media assets, most watched TV shows, and other content consumer-specific media preferences. The audience-based parameters may include calculated values derived by processing of media consumption data for a group of content consumers segregated by demographics such as age, region, and the like. The group of content consumers may be associated with respective consumer devices of the plurality of consumer devices 114a, . . . , 114n. By use of the viewer data repository 332, content development by an entity, such as content owners, may target a known market with precision. The behavioral data of the content consumers may be shared among the entities, such as the content owners and the content distributors, without involvement of any third-party that currently measures viewership data and sells such data to content owners and distributors at a premium/high cost.

The integrated license server 334 may correspond to an integrated DRM server managed or shared by multiple entities. In some embodiments, content rights of certain media content may be dynamically acquired from the plurality of different content owners using a single integrated license server, such as the integrated license server 334. In some embodiments, each entity, such as a content owner or a content distributor, may have their own DRM server to provide media content rights. Further in some embodiments, media content rights may be dynamically and automatically generated and provided to the asking entity by the integrated license server 334 based on the agreed parameters in a final media content rights transaction.

FIGS. 4A through 4G depict various flow charts illustrating exemplary operations for media content rights transferal based on a protocol for management of media content rights using a distributed media rights transaction ledger in the ecosystem 100 of FIG. 1, in accordance with an exemplary embodiment of the disclosure. With reference to FIGS. 4A to 4G, there are shown flowcharts 400A to 400G, described in conjunction with each other.

Figure 4A:
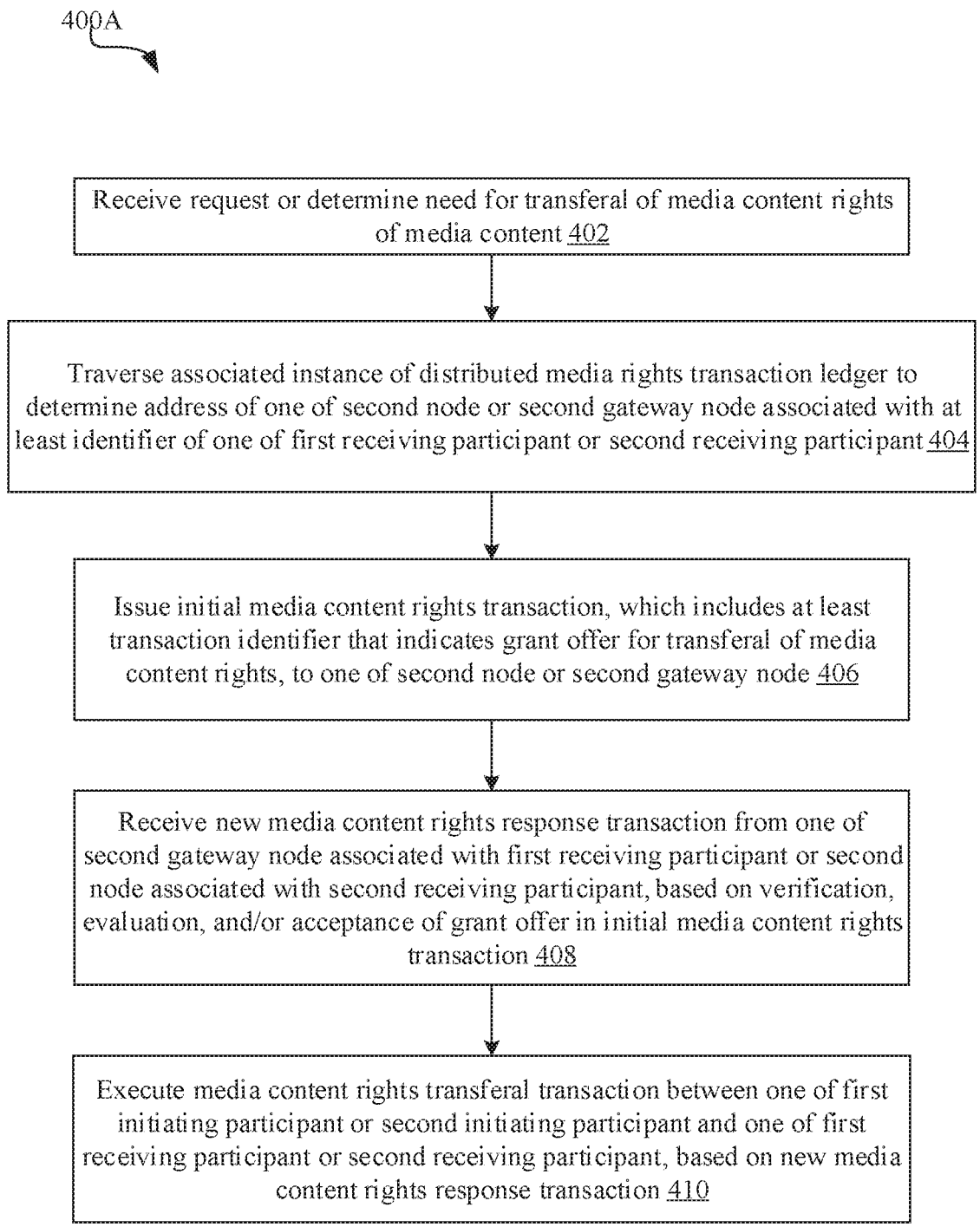
FIGS. 4A through 4G depict various flow charts illustrating exemplary operations for media content rights transferal based on a protocol for management of media content rights using a distributed media rights transaction ledger in the ecosystem 100 of FIG. 1, in accordance with an exemplary embodiment of the disclosure.

Specifically, flowchart 400A in FIG. 4A illustrates exemplary operations for execution of media content rights transferal transaction between one of the first initiating participant or the second initiating participant and one of the first receiving participant or the second receiving participant. In other words, the media content rights transferal transaction is executed between one of the first content consumer 110a or the first content distributor entity 108b, and one of the second content consumer 110n and the second content distributor entity 108n.

Figure 4B:
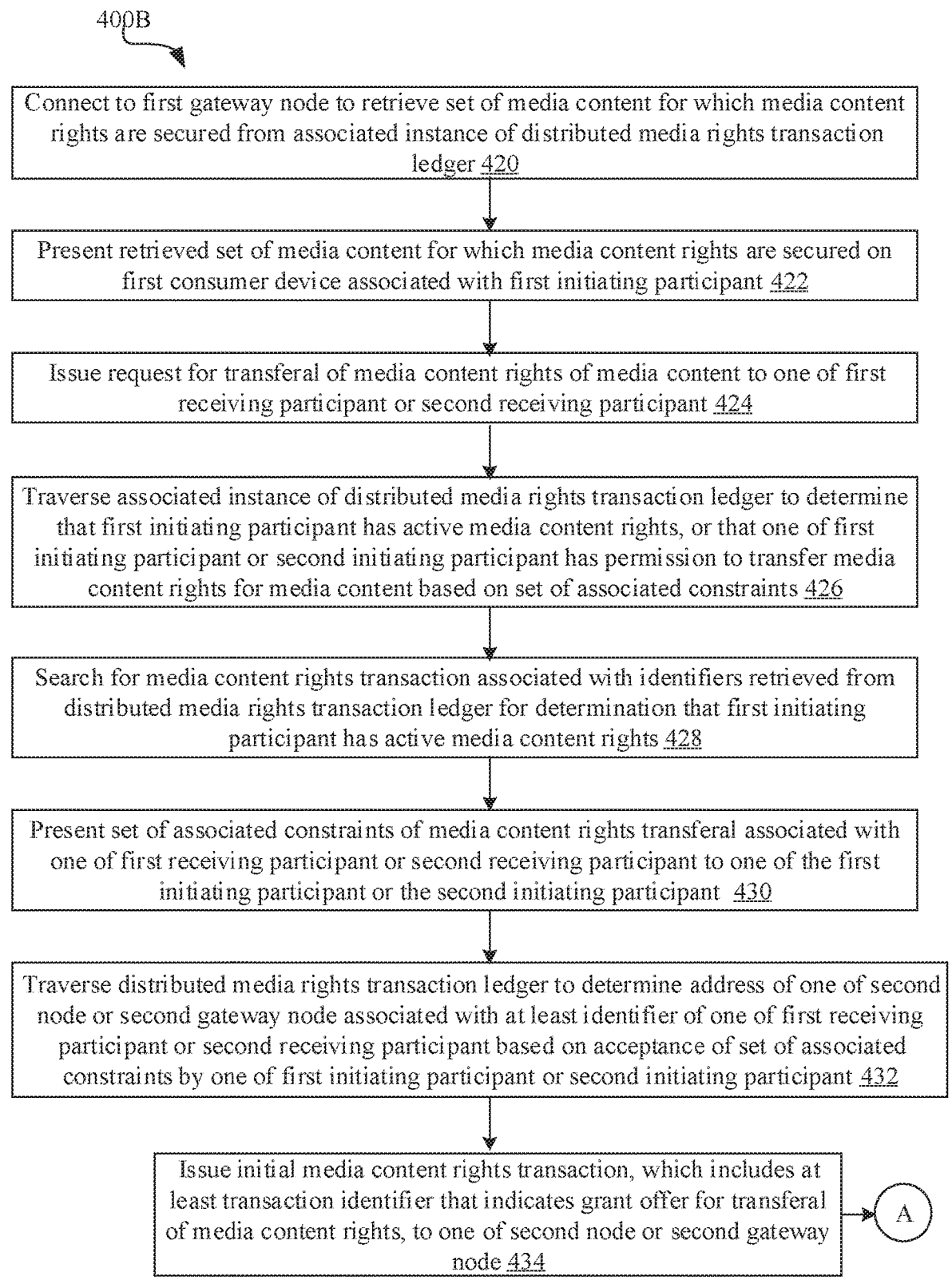
Figure 4C:
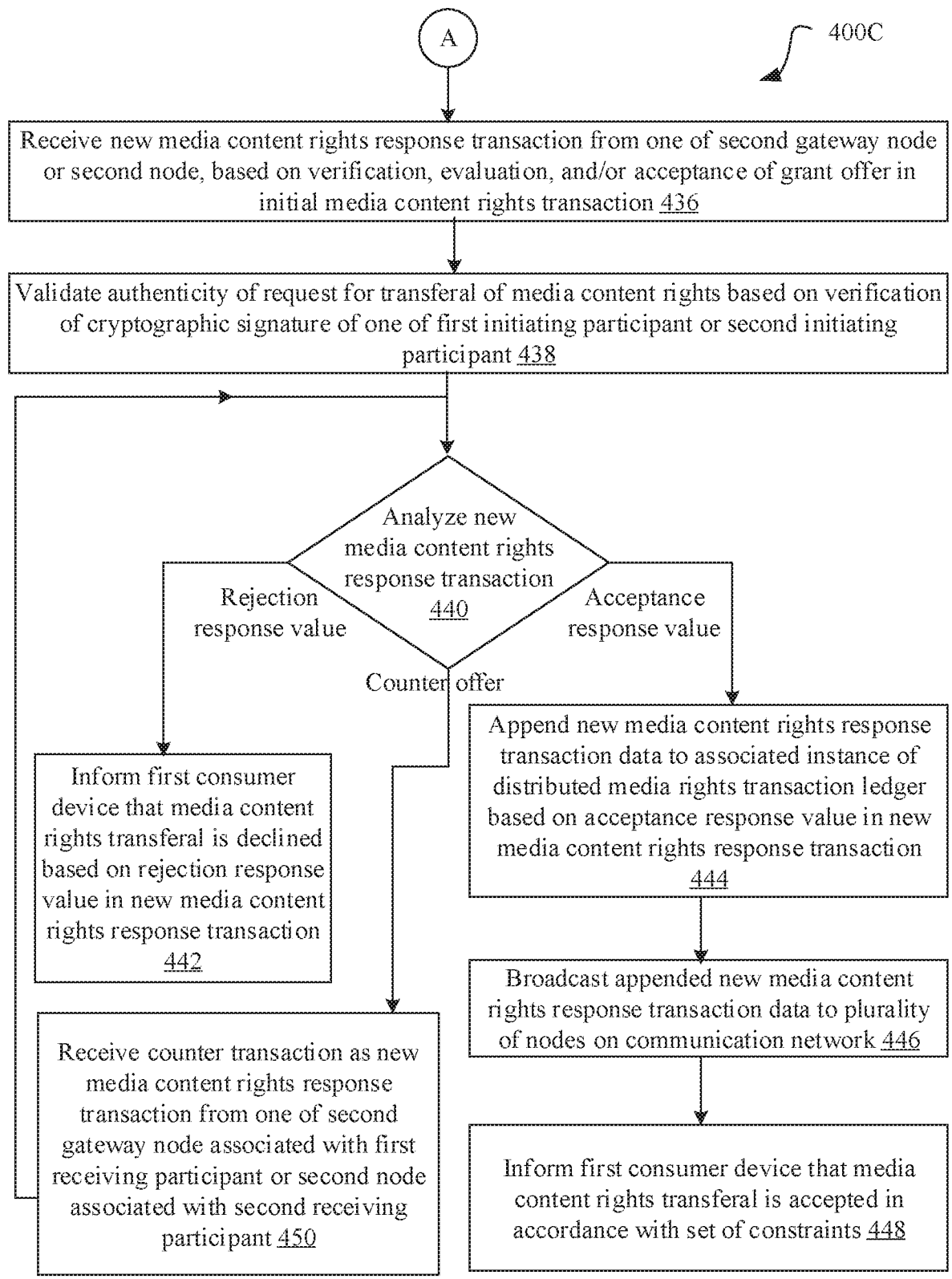

Further, flowcharts 400B and 400C in FIGS. 4B and 4C illustrate exemplary operations for execution of media content rights transferal transaction when the first initiating participant transfers the media content rights of the media content to one of the first receiving participant or the second receiving participant. In other words, media content rights transferal transaction is executed from the first content consumer 110a to one of the second content consumer 110n, and the second content distributor entity 108n.

Figure 4D:
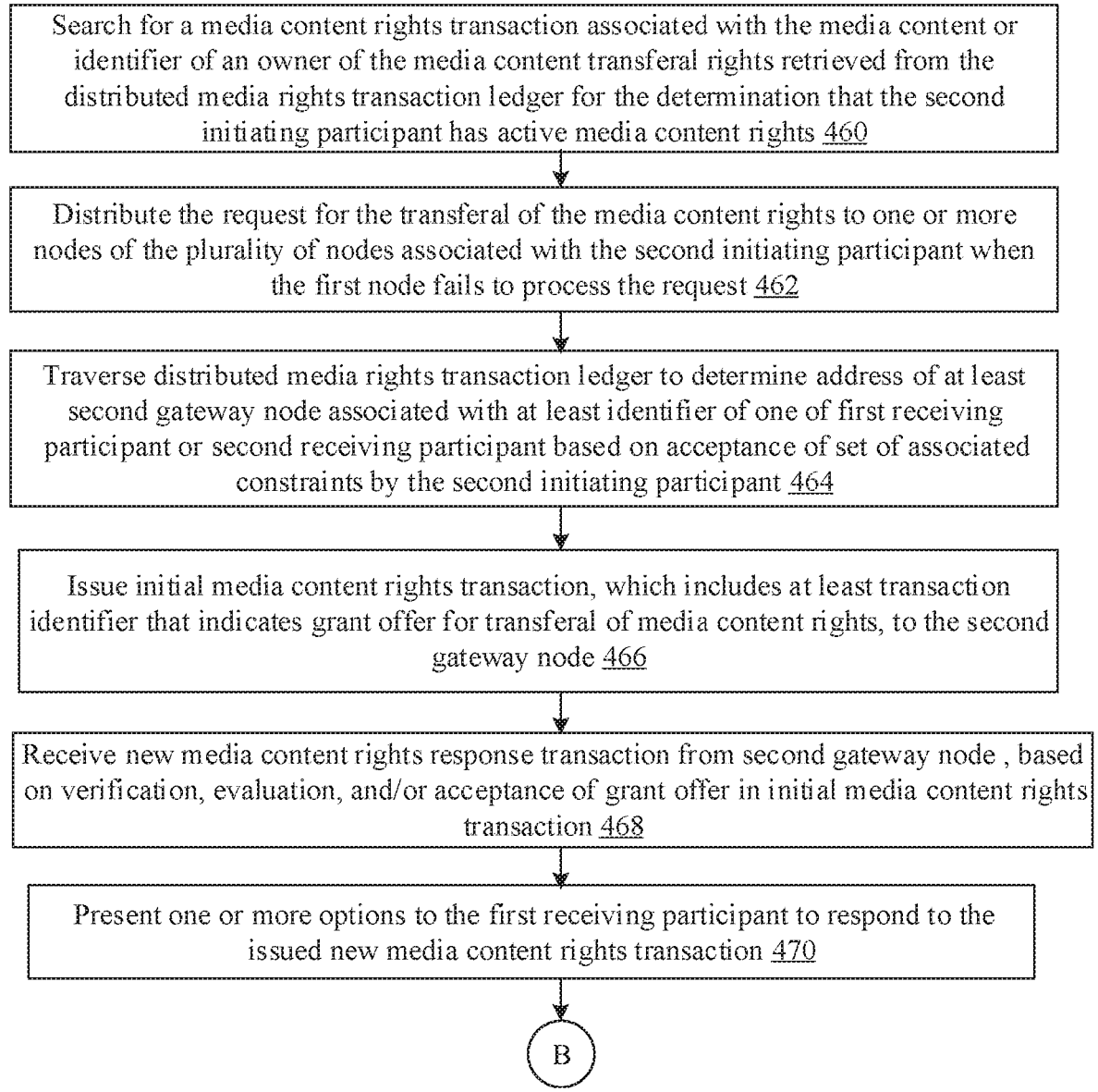
Figure 4E:
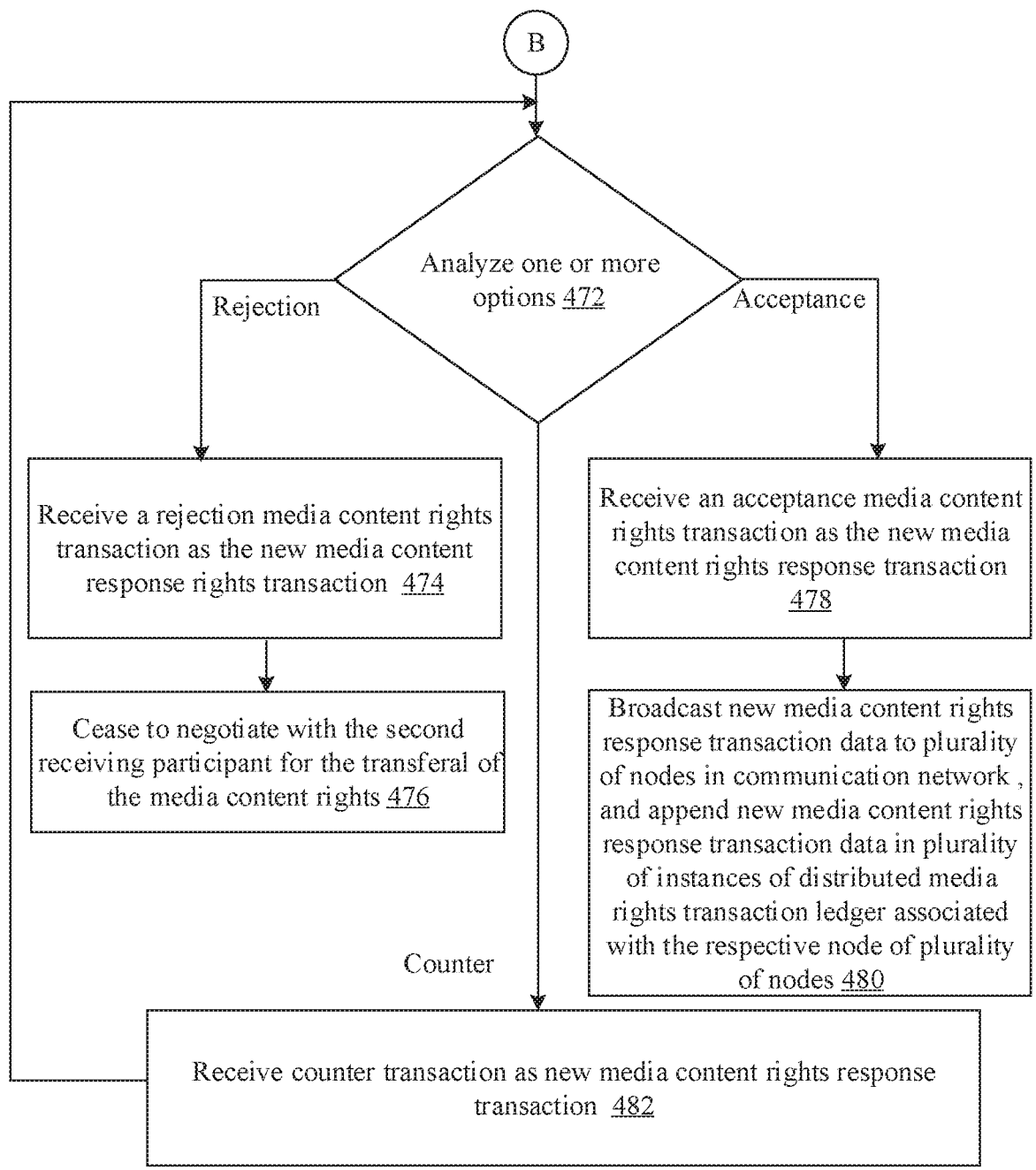

Further, flowchart 400D and 400E in FIGS. 4D and 4E illustrates exemplary operations for execution of media content rights transferal transaction when the second initiating participant transfers the media content rights of the media content to the first receiving participant. In other words, media content rights transferal transaction is executed from the first content distributor entity 108b to the second content consumer 110n.

Figure 4F:
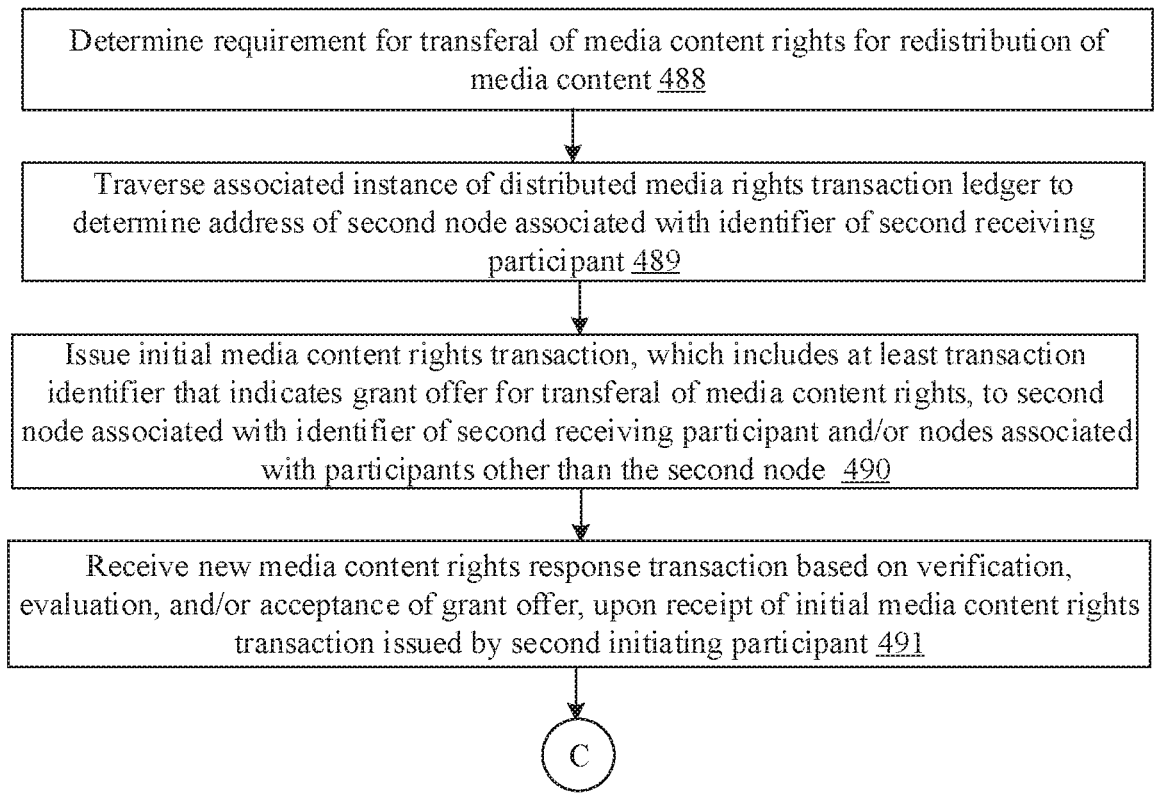
Figure 4G:
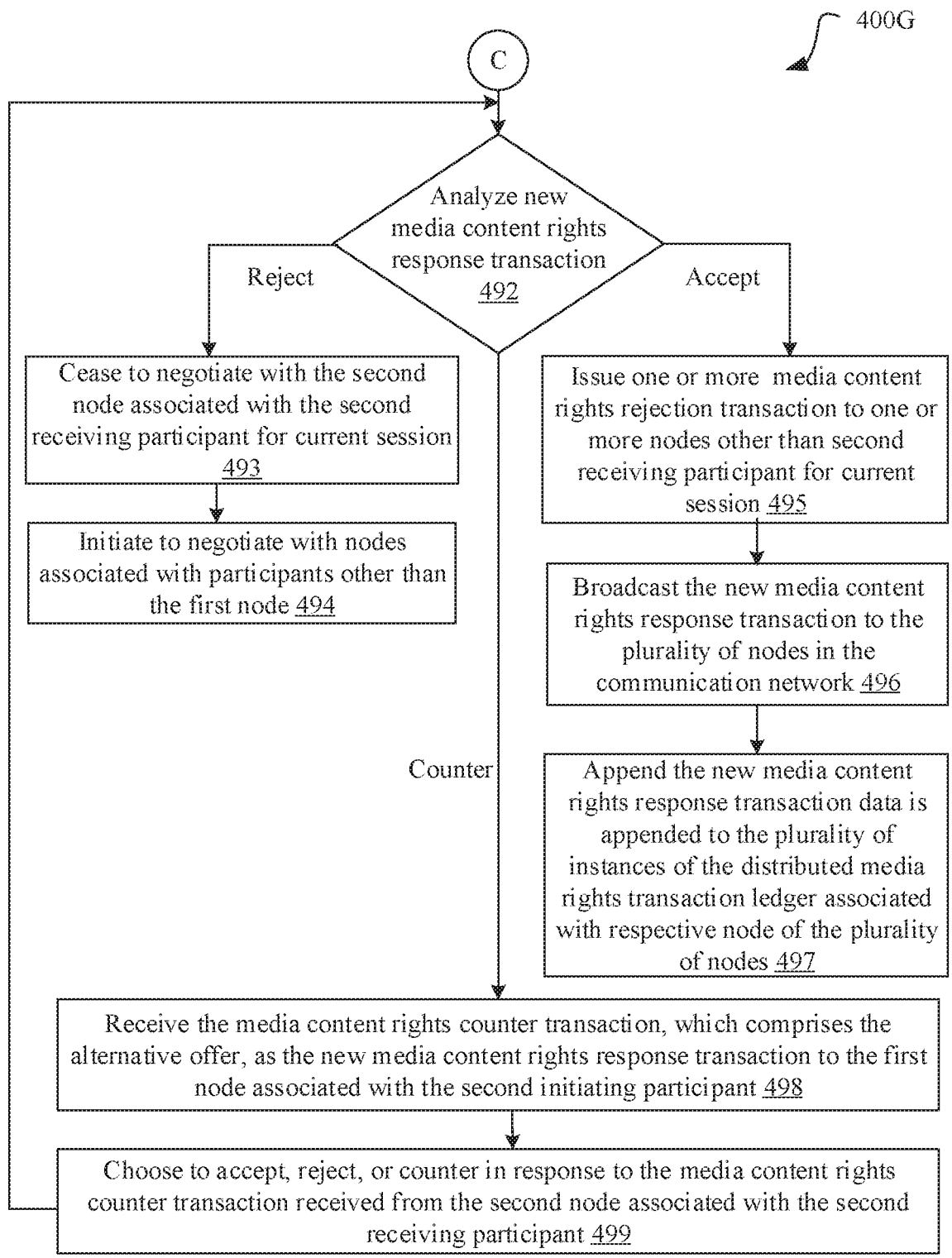

Further, flowchart 400F and 400G in FIGS. 4F and 4G illustrates exemplary operations for execution of media content rights transferal transaction when the second initiating participant transfers the media content rights of the media content to the second receiving participant. In other words, media content rights transferal transaction is executed from the first content distributor entity 108b to the second content distributor entity 108n.

Referring to FIG. 4A, at 402, a request may be received or a need determined for transferal of media content rights of a media content. In accordance with an embodiment, one of a first gateway node 102a or a first node 102b of the plurality of nodes 102a, . . . , 102n, associated with one of a first initiating participant or a second initiating participant, respectively, may be configured to receive a request or determine a need for transferal of media content rights of a media content. The first initiating participant may be interchangeably used with the first content consumer 110a and the second initiating participant may be interchangeably used with the first content distributor entity 108b.

In accordance with an embodiment, the request for the transferal of the media content rights issued to the first gateway node 102a comprises at least identifiers associated with one of the first initiating participant or the second initiating participant, the media content, a respective owner of the media content transferal rights, and the first receiving participant and the second receiving participant retrieved from the distributed media rights transaction ledger.

In accordance with an embodiment, the request for the transferal of the media content rights is a direct request from the first receiving participant, such as the second content consumer 110n. The direct request may comprise information associated with one of the first initiating participant or the second initiating participant, the media content, and an owner of the media content transferal rights, based on the associated instance of the distributed media rights transaction ledger 104.

In accordance with an embodiment, the second initiating participant such as the first content distributor entity 108b, determines a requirement for the transferal of the media content rights for redistribution of the media content. The determination of the transferal requirement and/or the received request for the transferal of the media content rights may be based on information associated with one or more of consumption history of the first content consumer 110a or a group of content consumers 110a, . . . , 110n, historical media content rights acquisition for a content consumer or a group of content consumers, historical media content rights acquisition for an entity or entities, and historical media content rights acquisition from an entity or entities. The determination of the transferal requirement and/or the received request for the media content rights may be further based on a request for the media content rights received from at least a participant associated with a consumer device or a presence of the media content in a programming schedule of the first node 102b. The determination of the transferal requirement and/or the received request for the transferal of the media content rights may be based on one or more of a statistical analysis of a content consumer or consumers consumption habits, and/or historical pricing for at least the content consumers and/or a plurality of initiating and receiving entities, or a predictive model to anticipate demand for the requested media content.

In accordance with an embodiment, the first gateway node 102a may correspond to the gateway system 302, such as the streaming media and VOD service provider. In accordance with an embodiment, the request may be received by the node, such as first gateway node 102a or the first node 102b, that is accessible to the plurality of consumer devices 114a, . . . , 114n, via the APIs 312. The APIs 312 may allow the plurality of content consumers 110a, . . . , 110n to interact with the plurality of nodes 102a, . . . , 102n in the communication network 106.

In accordance with an embodiment, the content consumer, such as the first content consumer 110a, associated with the first consumer device 114a, may be a participant in the communication network 106 but may not be required to operate a node of the plurality of nodes 102a, . . . , 102n.

At 404, an associated instance of the distributed media rights transaction ledger 104 may be traversed to determine an address of one of the second gateway node 102m or the second node 102n associated with at least an identifier of one of first receiving participant or the second receiving participant. The first receiving participant may correspond to the second content consumer 110n and the second receiving participant may correspond to the second content distributor entity 108n.

In accordance with an embodiment, one of the first gateway node 102a or the first node 102b of the plurality of nodes 102a, . . . , 102n, associated with one of a first initiating participant or a second initiating participant, respectively, may be configured to traverse an associated instance of the distributed media rights transaction ledger 104 to determine the address of one of the second gateway node 102m or the second node 102n associated with at least an identifier of one of first receiving participant or the second receiving participant.

At 406, an initial media content rights transaction, which includes at least a transaction identifier that indicates a grant offer for the transferal of the media content rights, may be issued to one of the second gateway node 102m or the second node 102n.

In accordance with an embodiment, one of the first gateway node 102a or the first node 102b of the plurality of nodes 102a, . . . , 102n, associated with one of a first initiating participant or a second initiating participant, respectively, may be configured to issue the initial media content rights transaction, which includes at least a transaction identifier that indicates a grant offer for the transferal of the media content rights, to one of the second gateway node 102m or the second node 102n.

At 408, new media content rights response transaction may be received from one of the second gateway node 102m associated with the first receiving participant or the second node 102n associated with the second receiving participant, based on verification, evaluation, and/or acceptance of the grant offer in the initial media content rights transaction.

In accordance with an embodiment, one of the first gateway node 102a or the first node 102b of the plurality of nodes 102a, . . . , 102n, associated with one of a first initiating participant or a second initiating participant, respectively, may be configured to receive the new media content rights response transaction from one of the second gateway node 102m associated with the first receiving participant or the second node 102n associated with the second receiving participant. The new media content rights response transaction may be received based on verification, evaluation, and/or acceptance of the grant offer in the initial media content rights transaction.

At 410, media content rights transferal transaction may be executed between one of the first initiating participant or the second initiating participant and one of the first receiving participant or the second receiving participant, based on the new media content rights response transaction.

In accordance with an embodiment, one of the first gateway node 102a or the first node 102b of the plurality of nodes 102a, . . . , 102n, associated with one of a first initiating participant or a second initiating participant, respectively, may be configured to execute the transferal of the media content rights transferal transaction from one of the first initiating participant or the second initiating participant to one of the first receiving participant or the second receiving participant, based on the new media content rights response transaction.

Now referring to flowcharts 400B and 400C in FIGS. 4B and 4C that illustrate exemplary operations for execution of media content rights transferal transaction when the first initiating participant transfers the media content rights of the media content to one of the first receiving participant or the second receiving participant. A first assumption or a first initial condition for the exemplary operations described in the flowcharts 400B and 400C may be that the media content rights of the media content with a set of associated constraints are secured and owned by one of the first initiating participant or the second initiating participant. A second assumption or a second initial condition for the exemplary operations described in the flowcharts 400B and 400C may be that one of the first initiating participant or the second initiating participant with the media content rights initiates the transferal of the media content rights.

At 420, the first gateway node 102a may be connected to retrieve a set of media content for which media content rights are secured from associated instance of distributed media rights transaction ledger 104. In accordance with an embodiment, the first consumer device 114a associated with the first initiating participant, such as first content consumer 110a, may be configured to connect to the first gateway node 102a to retrieve the set of media content for which the media content rights are secured from the associated instance of distributed media rights transaction ledger 104.

At 422, the retrieved set of media content for which the media content rights are secured may be presented on the first consumer device 114a associated with the first initiating participant, such as the first content consumer 110a. In accordance with an embodiment, the first consumer device 114a associated with the first initiating participant, such as first content consumer 110a, may be configured to present the retrieved set of media content for which the media content rights are secured on the first consumer device 114a associated with the first initiating participant, such as the first content consumer 110a. The media content rights may correspond to one or more of playback media content rights, download media content rights, or transferal media content rights.

At 424, a request may be issued for transferal of the media content rights of the media content to one of the first receiving participant, such as the second content consumer 110n, or the second receiving participant, such as the second content distributor entity 108n. In accordance with an embodiment, the first initiating participant, such as first content consumer 110a, may be configured to select one of the retrieved set of media content presented on the first consumer device 114a. Thereafter, the first initiating participant, such as first content consumer 110a, may be configured to issue the request for the transferal of the media content rights of the media content to one of the first receiving participant, such as the second content consumer 110n, or the second receiving participant, such as the second content distributor entity 108n.

The request for the transferal of the media content rights issued to the first gateway node 102a may comprise at least identifiers associated with one of the first initiating participant or the second initiating participant, the media content, a respective owner of the media content transferal rights, the first receiving participant and the second receiving participant retrieved from the distributed media rights transaction ledger 104.

At 426, an associated instance of the distributed media rights transaction ledger 104 may be traversed to determine that the first initiating participant, such as the first content consumer 110a, has active media content rights. Alternatively, the associated instance of the distributed media rights transaction ledger 104 may be traversed to determine that one of the first initiating participant, such as the first content consumer 110a, or the second initiating participant, such as the first content distributor entity 108b, has permission to transfer the media content rights for the media content based on the set of associated constraints.

In accordance with an embodiment, the first gateway node 102*a* associated with the first content consumer 110*a* or the first content distributor entity 108*b* may be configured to traverse the associated instance of the distributed media rights transaction ledger 104 to determine that the first initiating participant, such as the first content consumer 110*a*, has active media content rights.

Alternatively, the associated instance of the distributed media rights transaction ledger 104 may be traversed to determine that one of the first initiating participant, such as the first content consumer 110*a*, or the second initiating participant, such as the first content distributor entity 108*b*, has permission to transfer the media content rights for the media content based on the set of associated constraints. Such set of associated constraints may be defined by a set of negotiated media content rights. The set of associated constraints may comprise at least a time duration for length of the transferal of the media content rights, one or more restrictions associated with the first receiving participant and the second receiving participant, a download or offline access, a condition whether initiating and receiving participants can leverage the media content simultaneously or if mutually exclusive media content rights transferal is permitted where only one of the initiating or receiving participants can leverage the media content at a given time, playback frequency limits, and restrictions and quality level related to the second consumer device 114*n*.

At 428, the media content rights transaction associated with identifiers retrieved from the distributed media rights transaction ledger 104 may be searched to determine that the first initiating participant, such as the first content consumer 110*a*, has active media content rights. In accordance with an embodiment, the first gateway node 102*a* associated with the first content consumer 110*a* or the first content distributor entity 108*b* may be configured to search for the media content rights transaction associated with identifiers retrieved from the distributed media rights transaction ledger 104. Accordingly, it may be determined that the first initiating participant, such as the first content consumer 110*a*, has active media content rights.

At 430, the set of associated constraints of the media content rights transferal associated with one of the first receiving participant, such as the second content consumer 110*n*, or the second receiving participant, such as the second content distributor entity 108*n*, may be presented to the one of the first initiating participant or the second initiating participant.

In accordance with an embodiment, the first gateway node 102*a* may be configured to present the set of associated constraints of the media content rights transferal associated with one of the first receiving participant, such as the second content consumer 110*n*, or the second receiving participant, such as the second content distributor entity 108*n*, to the one of the first initiating participant or the second initiating participant.

At 432, the distributed media rights transaction ledger 104 may be traversed to determine an address of one of the second node or the second gateway node associated with at least the identifier of one of the first receiving participant or the second receiving participant based on an acceptance of the set of associated constraints by one of the first initiating participant or the second initiating participant.

In accordance with an embodiment, the first gateway node 102*a* may be configured to traverse the distributed media rights transaction ledger 104 to determine an address of one of the second gateway node 102*m* or the second node 102*n* associated with at least the identifier of one of the first receiving participant or the second receiving participant based on an acceptance of the set of associated constraints by one of the first initiating participant or the second initiating participant.

At 434, an initial media content rights transaction, which includes at a least transaction identifier that indicates a grant offer for transferal of media content rights, may be issued to one of the second gateway node 102*m* or the second node 102*n*. In accordance with an embodiment, one of the first gateway node 102*a* or the first node 102*b* associated with one of the first initiating participant or the second initiating participant, respectively, may be configured to issue the initial media content rights transaction, which includes at least a transaction identifier that indicates grant offer for transferal of media content rights, to one of the second gateway node 102*m* or the second node 102*n*.

The initial media content rights transaction may further include identifiers associated with one or more of the first initiating participant or the second initiating participant, the media content, media content transferal rights owner, the first receiving participant or the second receiving participant, parameters associated with a specific media content rights transferal, a cryptographic identifier of media content rights transaction data that can be referenced by another media content rights transaction, cryptographically signed by the first initiating participant or the second initiating participant.

In accordance with an embodiment, based on the received initial media content rights transaction, one of the second gateway node 102*m* or the second node 102*n*, may be configured to validate authenticity of the request for the transferal of the media content rights based on verification of cryptographic signature of one of the first initiating participant or the second initiating participant. One of the second gateway node 102*m* or the second node 102*n*, may be further configured to validate that one of the first receiving participant and the second receiving participant can accept the request for the transferal of the media content rights based on a confirmation that the set of associated constraints is non-conflicting against one of the first initiating participant or the second initiating participant.

Accordingly, one of the second gateway node 102*m* associated with the first receiving participant or the second node 102*n* associated with the second receiving participant may be configured to issue a new media content rights response transaction based on verification, evaluation, and/or acceptance of the grant offer in the initial media content rights transaction.

At 436, new media content rights response transaction may be received from one of the second gateway node 102*m* or the second node 102*n*, based on verification, evaluation, and/or acceptance of grant offer in the initial media content rights transaction. In accordance with an embodiment, one of the first gateway node 102*a* or the first node 102*b* associated with one of the first initiating participant or the second initiating participant, respectively, may be configured to receive the new media content rights response transaction from one of the second gateway node 102*m* or the second node 102*n*, based on verification, evaluation, and/or acceptance of grant offer in the initial media content rights transaction.

At 438, authenticity of the request for transferal of media content rights may be validated based on verification of a cryptographic signature of one of the first initiating participant or the second initiating participant. In accordance with an embodiment, one of the first gateway node 102*a* or the first node 102*b* associated with one of the first initiating participant or the second initiating participant, respectively, may be configured to validate the authenticity of the request for the transferal of media content rights based on verification of cryptographic signature of one of the first initiating participant or the second initiating participant.

At 440, the new media content rights response transaction may be analyzed. In accordance with an embodiment, one of the first gateway node 102a or the first node 102b associated with one of the first initiating participant or the second initiating participant, respectively, may be configured to analyze the new media content rights response transaction.

Based on the analysis, in an embodiment, one of the first gateway node 102a or the first node 102b associated with one of the first initiating participant or the second initiating participant, respectively, may determine a reject response value in the new media content rights response transaction. In such embodiment, control passes to 442.

In another embodiment, one of the first gateway node 102a or the first node 102b associated with one of the first initiating participant or the second initiating participant, respectively, may determine an acceptance response value in the new media content rights response transaction. In such embodiment, control passes to 444.

In another embodiment, one of the first gateway node 102a or the first node 102b associated with one of the first initiating participant or the second initiating participant, respectively, may determine a counteroffer in the new media content rights response transaction. In such embodiment, control passes to 448.

At 442, the first consumer device 114a may be informed that the media content rights transferal is declined based on rejection response value in new media content rights response transaction. In accordance with an embodiment, one of the first gateway node 102a or the first node 102b associated with one of the first initiating participant or the second initiating participant, respectively, may inform the first consumer device 114a that the media content rights transferal is declined.

At 444, new media content rights response transaction data may be appended to associated instance of the distributed media rights transaction ledger 104 based on acceptance response value in new media rights response transaction. In accordance with an embodiment, one of the first gateway node 102a or the first node 102b associated with one of the first initiating participant or the second initiating participant, respectively, may be configured to append the new media content rights response transaction data to the associated instance of the distributed media rights transaction ledger 104.

At 446, the appended new media content rights response transaction data may be broadcasted to the plurality of nodes 102a, . . . , 102n on the communication network 106. In accordance with an embodiment, one of the first gateway node 102a or the first node 102b associated with one of the first initiating participant or the second initiating participant, respectively, may be configured to broadcast the appended new media content rights response transaction data to the plurality of nodes 102a, . . . , 102n on the communication network 106.

Examples of the new media content rights response transaction data may include identifiers of the identifiers associated with one or more of the first initiating participant or the second initiating participant per the distributed media rights transaction ledger 104, the media content, media content transferal rights owner per the distributed media rights transaction ledger 104, the first receiving participant or the second receiving participant per the distributed media rights transaction ledger 104, parameters (such as various constraints, contract parameters, and attributes) associated with a specific media content rights transferal, a cryptographic identifier of media content rights transaction data that can be referenced by another media content rights transaction, and cryptographically signed by the first initiating participant or the second initiating participant.

At 448, the first consumer device 114a may be informed that the media content rights transferal is accepted in accordance with the set of constraints. In accordance with an embodiment, one of the first gateway node 102a or the first node 102b associated with one of the first initiating participant or the second initiating participant, respectively, may inform the first consumer device 114a that the media content rights transferal is accepted in accordance with the set of constraints.

At 450, based on the counter offer determined in the new media content rights response transaction, a counter transaction may be received as the new media content rights response transaction from one of the second gateway node 102m associated with the first receiving participant, such as the second content consumer 110n, or the second node 102n associated with second receiving participant, such as the second content distributor entity 108n. In accordance with an embodiment, one of the first gateway node 102a or the first node 102b associated with one of the first initiating participant or the second initiating participant, respectively, may receive the counter transaction as the new media content rights response transaction, and control passes back to 440 to iteratively execute the exemplary operations 440 to 450. Accordingly, based on the counter of the grant offer for the transferal of the media content rights by the first receiving participant, the second gateway node 102m may be configured to further accept, reject or counter the counter of the grant offer.

Now referring to flowcharts 400D and 400E in FIGS. 4D and 4E that illustrate exemplary operations for execution of media content rights transferal transaction when the second initiating participant transfers the media content rights of the media content to the first receiving participant. A first assumption or a first initial condition for the exemplary operations described in the flowcharts 400D and 400E may be that the media content rights to the media content with a set of associated constraints are secured by the second initiating participant. A second assumption or a second initial condition for the exemplary operations described in the flowcharts 400D and 400E may be that the first receiving participant or the second receiving participant generates the request for the transferal of the media content rights from the first initiating participant or the second initiating participant with the media content rights to the media content. Alternatively, the second initiating participant with the media content rights to the media content elects for the transferal of the media content rights to the second receiving participant or a group of second participants associated with another entity based on request/referral external to media content rights transferees.

At 458, a request for the transferal of the media content rights may be received. In accordance with an embodiment, the first node 102b associated with the second initiating participant, such as the first content distributor entity 108b, may be configured to receive the request for the transferal of the media content rights from a first receiving participant, such as the second content consumer 110n, as a direct request. In accordance with an embodiment, the first node 102b associated with the second initiating participant, such as the first content distributor entity 108b, may be configured to receive the request that is external to the first or the second receiving participant.

Such direct or external request may comprise information associated with one of the first initiating participant or the second initiating participant, the media content, and an owner of the media content transferal rights, based on the associated instance of the distributed media rights transaction ledger 104.

At 460, a media content rights transaction associated with the media content or identifier of an owner of the media content transferal rights retrieved from the distributed media rights transaction ledger 104 may be searched for the determination that the second initiating participant has active media content rights. In accordance with an embodiment, the first node 102b associated with the second initiating participant, such as the first content distributor entity 108b, may be configured to search for the media content rights transaction associated with the media content or identifier of the owner of the media content transferal rights retrieved from the distributed media rights transaction ledger 104 for the determination that the second initiating participant has active media content rights.

In accordance with an embodiment, the first node 102b associated with the second initiating participant may be configured to determine that the first node 102b associated with the second initiating participant, such as the first content distributor entity 108b, is permitted to transfer media content rights for selected media content per set of associated constraints. The set of associated constraints may be defined by a set of negotiated media content rights. The set of associated constraints may comprise at least a time duration for length of the transferal of the media content rights, one or more restrictions associated with the first receiving participant, a download or offline access, a condition whether one of the first initiating participant or the second initiating participant and the first receiving participant can leverage the media content simultaneously or if mutually exclusive media content rights transferal is permitted where only one of the first initiating participant or the second initiating participant and the first receiving participant can leverage the media content at a given time, playback frequency limits, and restrictions and quality level related to a second consumer device 114n.

At 462, the request for the transferal of the media content rights may be distributed to one or more nodes of the plurality of nodes 102a, . . . , 102n associated with the second initiating participant when the first node 102b fails to process the request. In accordance with an embodiment, the first node 102b associated with the second initiating participant, such as the first content distributor entity 108b, may be configured to distribute the request for the transferal of the media content rights to one or more nodes of the plurality of nodes 102a, . . . , 102n associated with the second initiating participant when the first node 102b fails to process the request.

At 464, the distributed media rights transaction ledger 104 may be traversed to determine address of at least second gateway node 102m associated with at least identifier of one of first receiving participant or second receiving participant based on acceptance of set of associated constraints by the second initiating participant. In accordance with an embodiment, the first node 102b associated with the second initiating participant, such as the first content distributor entity 108b, may be configured to traverse the distributed media rights transaction ledger 104 to determine address of at least second gateway node 102m associated with at least identifier of one of first receiving participant or second receiving participant based on acceptance of set of associated constraints by the second initiating participant.

At 466, initial media content rights transaction, which includes at least a transaction identifier that indicates grant offer for transferal of media content rights, may be issued to the second gateway node 102m. In accordance with an embodiment, the first node 102b associated with the second initiating participant, such as the first content distributor entity 108b, may be configured to issue the initial media content rights transaction, which includes at least a transaction identifier that indicates grant offer for transferal of media content rights, to the second gateway node 102m.

The initial media content rights transaction may further include identifiers associated with one or more of the first initiating participant or the second initiating participant, the media content, media content transferal rights owner, the first receiving participant or the second receiving participant, parameters associated with a specific media content rights transferal, a cryptographic identifier of media content rights transaction data that can be referenced by another media content rights transaction, cryptographically signed by the first initiating participant or the second initiating participant.

In accordance with an embodiment, based on the received initial media content rights transaction, the second gateway node 102m associated with the first receiving participant, may be configured to validate authenticity of the request for the transferal of the media content rights based on verification of cryptographic signature of one of the first initiating participant. The second gateway node 102m associated with the first receiving participant, may be further configured to validate that one of the first receiving participant or the second receiving participant can accept the request for the transferal of the media content rights based on a confirmation that the set of associated constraints is non-conflicting against the second initiating participant.

At 468, new media content rights response transaction may be received from second gateway node, based on verification, evaluation, and/or acceptance of grant offer in initial media content rights transaction. In accordance with an embodiment, the first node 102b associated with the second initiating participant, such as the first content distributor entity 108b, may be configured to receive the new media content rights response transaction from the second gateway node 102m, based on verification, evaluation, and/or acceptance of grant offer in initial media content rights transaction.

At 470, one or more options may be presented to the first receiving participant to respond to the issued new media content rights transaction. In accordance with an embodiment, the first node 102b associated with the second initiating participant, such as the first content distributor entity 108b, may be configured to present one or more options to the first receiving participant to respond to the issued new media content rights transaction. The one or more options for the issued new media content rights transaction may be one of an acceptance, a rejection or a counter of the grant offer for the transferal of the media content rights.

At 472, an option selected by the first receiving participant may be analyzed. In accordance with an embodiment, the first node 102b associated with the second initiating participant, such as the first content distributor entity 108b, may be configured to analyze the option selected by the first receiving participant.

In an embodiment, the option selected by the first receiving participant may be a rejection of the grant offer for the transferal of the media content rights. Accordingly, the second gateway node 102*m* may be configured to issue a rejection media content rights transaction as the new media content rights response transaction to the first node 102*b* associated with the second initiating participant. In such embodiment, control passes to 474.

In another embodiment, the option selected by the first receiving participant may be an acceptance of the grant offer for the transferal of the media content rights. Accordingly, the second gateway node 102*m* may be configured to issue an accept media content rights transaction as the new media content rights response transaction to the first node 102*b* associated with the second initiating participant. In such embodiment, control passes to 478.

In another embodiment, the option selected by the first receiving participant may be a counter of the grant offer for the transferal of the media content rights. Accordingly, the second gateway node 102*m* may be configured to issue a counter media content rights transaction as the new media content rights response transaction to the first node 102*b* associated with the second initiating participant. In such embodiment, control passes to 480.

At 474, a rejection media content rights transaction may be received as the new media content rights response transaction. In accordance with an embodiment, when the option selected by the first receiving participant is a rejection of the grant offer for the transferal of the media content rights, the first node 102*b* associated with the second initiating participant, such as the first content distributor entity 108*b*, may be configured to receive a rejection media content rights transaction as the new media content rights response transaction from the second gateway node 102*m*.

At 476, negotiation with the first receiving participant for the transferal of the media content rights may be ceased. In accordance with an embodiment, the first node 102*b* associated with the second initiating participant, such as the first content distributor entity 108*b*, may be configured to cease the negotiation with the first receiving participant for the transferal of the media content rights.

At 478, an acceptance media content rights transaction may be received as the new media content rights response transaction. In accordance with an embodiment, when the option selected by the first receiving participant is an acceptance of the grant offer for the transferal of the media content rights, the first node 102*b* associated with the second initiating participant, such as the first content distributor entity 108*b*, may be configured to receive an accept media content rights transaction as the new media content rights response transaction from the second gateway node 102*m*.

At 480, the new media content rights response transaction data may be broadcasted to the plurality of nodes 102*a*, . . . , 102*n* in the communication network 106, and appended in the plurality of instances of the distributed media rights transaction ledger 104 associated with the respective node of the plurality of nodes 102*a*, . . . , 102*n*. In accordance with an embodiment, the first node 102*b* associated with the second initiating participant, such as the first content distributor entity 108*b*, may be configured to broadcast the new media content rights response transaction data to the plurality of nodes 102*a*, . . . , 102*n* in the communication network 106. Further, the new media content rights response transaction data may be appended in the plurality of instances of the distributed media rights transaction ledger 104 associated with the respective node of the plurality of nodes 102*a*, . . . , 102*n*.

The new media content rights response transaction data may comprise at least a summary of exchange of media content rights transactions between one of the second gateway node 102*m* or the second node 102*n* and the first node 102*b*. The summary may only be decrypted by either party. In this way, the exchange between the two remains private.

At 482, a counter media content rights transaction may be received as the new media content rights response transaction. In accordance with an embodiment, when the option selected by the first receiving participant is a counter of the grant offer (to provide an alternative offer) for the transferal of the media content rights, the first node 102*b* associated with the second initiating participant, such as the first content distributor entity 108*b*, may be configured to receive the counter media content rights transaction as the new media content rights response transaction from the second gateway node 102*m*. Control passes back to 472 to iteratively execute the exemplary operations 472 to 482.

Now referring to flowcharts 400F and 400G in FIGS. 4F and 4G that illustrate exemplary operations for execution of media content rights transferal transaction when the second initiating participant transfers the media content rights of the media content to the second receiving participant. A first assumption or a first initial condition for the exemplary operations described in the flowchart 400F may be that the media content rights to the media content with a set of associated constraints are secured and owned by the second initiating participant. A second assumption or a second initial condition for the exemplary operations described in the flowchart 400F may be that the second receiving participant generates the request for the transferal of the media content rights for the second initiating participant. Alternatively, the second initiating participant with the media content rights elects for the transferal of the media content rights to the second receiving participant.

At 488, a requirement for the transferal of the media content rights for redistribution of the media content may be determined. In accordance with an embodiment, the second initiating participant, such as the first content distributor entity 108*b* or a content owner 108*c*, may be configured to determine a requirement for the transferal of the media content rights for redistribution of the media content.

The determination of the transferal requirement and/or the received request for the transferal of the media content rights is based on information associated with various sources. A first exemplary source may be consumption history of the first content consumer 110*a* or a group of content consumers 110*a*, . . . , 110*n*, wherein the consumption history is retrieved from the associated instance of the distributed media rights transaction ledger 104. Another exemplary source may be historical media content rights acquisition for the first content consumer 110*a* or a group of content consumers 110*a*, . . . , 110*n*, wherein the information associated with historical content rights acquisition is retrieved from the associated instance of the distributed media rights transaction ledger 104. Another exemplary source may be historical media content rights acquisition for an entity or entities, wherein the information associated with the historical media content rights acquisition for the entity or entities is retrieved from the associated instance of the distributed media rights transaction ledger 104. Yet another exemplary source may be historical media content rights acquisition from an entity or entities, wherein the information associated with the historical media content rights acquisition for the entity or entities is retrieved from the associated instance of the distributed media rights transaction ledger 104.

In accordance with an embodiment, the determination of the transferal requirement and/or the received request for the media content rights may be based on a request for the media content rights received from at least a participant associated with a consumer device or a presence of the media content in a programming schedule of the first node 102b.

In accordance with an embodiment, the determination of the transferal requirement and/or the received request for the media content rights may originate from predictive model to anticipate demand for the requested media content. The anticipated demand for the media content may be based on one or more of a significant world event, a popularity change of a public figure, a popularity change of a subject matter, cultural influences, social and societal trends, demographics, a release or future release of alternative or related media content, a program schedule of an entity, and/or on-demand user requests.

The determination of the transferal requirement and/or the received request for the media content rights may further originate from a statistical analysis of a content consumer or consumers consumption habits, and/or historical pricing for at least the content consumers and/or a plurality of initiating and receiving entities.

At 489, an associated instance of the distributed media rights transaction ledger 104 may be traversed to determine an address of the second node 102n associated with an identifier of the second receiving participant, such as the second content distributor entity 108n or a second content owner (not shown). In accordance with an embodiment, the second initiating participant, such as the first content distributor entity 108b or a content owner 108c, may be configured to traverse the associated instance of the distributed media rights transaction ledger 104 to determine an address of the second node 102n associated with an identifier of one of the second receiving participant, such as the second content distributor entity 108n or a second content owner (not shown).

At 490, an initial media content rights transaction, which includes at least a transaction identifier that indicates grant offer for transferal of media content rights, may be issued to the second node 102n associated with the identifier of the second receiving participant, such as the second content distributor entity 108n or a second content owner (not shown). In accordance with an embodiment, the second initiating participant, such as the first content distributor entity 108b or a content owner 108c, may be configured to issue the initial media content rights transaction to the second node 102n associated with an identifier of one of the second receiving participant, such as the second content distributor entity 108n or a second content owner (not shown) and/or nodes associated with participants other than the second node 102n.

In accordance with an embodiment, the grant offer for the corresponding media content rights included in the initial media content rights transaction may comprise one or more of a monetary value, a trade for existing media content rights, and/or statistical data to be used for the evaluation of the grant offer by the second receiving participant.

In accordance with an embodiment, the initial media content rights transaction may further include identifiers of the second initiating participant, such as the first content distributor entity 108b, and the second receiving participant, such as the second content distributor entity 108n or a second content owner (not shown), specific attributes (for example, media content rights transferal) that the second initiating participant, such as the first content distributor entity 108b, seeks to transfer, identifier of the media content, and the initial media content rights transaction with the transaction type of INITIATE.

In accordance with an embodiment, to maintain privacy, the initial media content rights transaction between the first node 102b associated with the second initiating participant, such as the first content distributor entity 108b, and the second node 102n associated with the second receiving participant, such as the second content distributor entity 108n, is not broadcasted to remaining nodes of the plurality of nodes 102a, . . . , 102n in the communication network 106.

In accordance with an embodiment, the initial media content rights transaction between the first node 102b associated with the second initiating participant, such as the first content distributor entity 108b, and the second node 102n associated with the second receiving participant, such as the second content distributor entity 108n, is re-broadcasted to defined nodes associated with the second initiating participant and the second receiving participant to maintain synchronization.

In accordance with an embodiment, for the issuance of the new media content rights response transaction, the second node 102n associated with the second receiving participant, such as the second content distributor entity 108n, may be configured to determine the new media content rights response transaction. The new media content rights response transaction may be determined based on a verification, evaluation, and/or acceptance of the grant offer, upon a receipt of the initial media content rights transaction issued by the second initiating participant, such as the first content distributor entity 108b. In other words, the second node 102n associated with the second receiving participant, such as the second content distributor entity 108n, may validate the origin of the new media content rights response transaction by verifying the identity and signature of the first node 102b associated with the second initiating participant, such as the first content distributor entity 108b. The second receiving participant, such as the second content distributor entity 108n, may further evaluate the grant offer and determine the acceptance, rejection, or countering the grant offer. Accordingly, the new media content rights response transaction issued by the second receiving participant, such as the second content distributor entity 108n, may one of a media content rights accept transaction, a media content rights reject transaction, or a media content rights counter transaction.

In an embodiment, the second receiving participant, such as the second content distributor entity 108n, may reject the grant offer for the transferal of the media content rights. Accordingly, the second receiving participant, such as the second content distributor entity 108n, may be configured to issue a rejection media content rights transaction as the new media content rights response transaction to the first node 102b associated with the second initiating participant.

In another embodiment, the second receiving participant, such as the second content distributor entity 108n, may accept the grant offer for the transferal of the media content rights. Accordingly, the second receiving participant, such as the second content distributor entity 108n, may be configured to issue an accept media content rights transaction as the new media content rights response transaction to the first node 102b associated with the second initiating participant.

In another embodiment, the second receiving participant, such as the second content distributor entity 108n, may counter the grant offer for the transferal of the media content rights. Accordingly, the second receiving participant, such as the second content distributor entity 108n, may be configured to issue a counter media content rights transaction as the new media content rights response transaction to the first node 102b associated with the second initiating participant.

At 491, the new media content rights response transaction may be received from the second receiving participant, such as the second content distributor entity 108n, based on verification, evaluation, and/or acceptance of grant offer in initial media content rights transaction. In accordance with an embodiment, the first node 102b associated with the second initiating participant, such as the first content distributor entity 108b, may be configured to receive the new media content rights response transaction from the second receiving participant, such as the second content distributor entity 108n.

At 492, the new media content rights response transaction may be analyzed. In accordance with an embodiment, the first node 102b associated with the second initiating participant, such as the first content distributor entity 108b, may be configured to analyze the new media content rights response transaction.

Based on the analysis, in an embodiment, the first node 102b associated with the second initiating participant, such as the first content distributor entity 108b, may be configured to determine a reject response value in the new media content rights response transaction. In such embodiment, control passes to 493.

In another embodiment, the first node 102b associated with the second initiating participant, such as the first content distributor entity 108b, may be configured to determine an acceptance response value in the new media content rights response transaction. In such embodiment, control passes to 495.

In another embodiment, the first node 102b associated with the second initiating participant, such as the first content distributor entity 108b, may be configured to determine a counteroffer in the new media content rights response transaction. In such embodiment, control passes to 498.

At 493, negotiation with the second node 102n associated with the second receiving participant for the current session may be ceased. In accordance with an embodiment, based on the media content rights reject transaction issued by the second node 102n associated with the second receiving participant, the first node 102b associated with the second initiating participant may be configured to cease to negotiate with the second node 102n associated with the second receiving participant for the current session.

At 494, negotiation with nodes associated with participants other than the first node 102b may be initiated. In accordance with an embodiment, the first node 102b associated with the second initiating participant may be configured to initiate to negotiate with nodes associated with participants other than the first node 102b.

At 495, one or more media content rights rejection transaction may be issued to one or more nodes other than the second receiving participant for current session. In accordance with an embodiment, based on the media content rights accept transaction issued by the second node associated with the second receiving participant, the first node 102b associated with the second initiating participant may be further configured to issue reject media content rights response transaction to one or more nodes other than the second receiving participant for current session.

At 496, the new media content rights response transaction may be broadcasted to the plurality of nodes 102a, ..., 102n in the communication network 106. In accordance with an embodiment, the second node 102n associated with the second receiving participant may be further configured to broadcast the new media content rights response transaction to the plurality of nodes 102a, ..., 102n in the communication network 106.

In an embodiment, the new media content rights transaction may comprise at least an encrypted summary of exchange of one or more other new media content rights response transactions issued between nodes associated with the first initiating participant and the second node associated with the receiving entity, such that a summary can be decrypted by the first node associated with the second initiating participant and the second node associated with the second receiving participant.

At 497, the new media content rights response transaction data may be appended to the plurality of instances of the distributed media rights transaction ledger 104 associated with respective node of the plurality of nodes 102a, ..., 102n. In accordance with an embodiment, the first node 102b and the second node 102n associated with the second initiating participant and the second receiving participant, respectively, may be further configured to append the new media content rights response transaction data to the plurality of instances of the distributed media rights transaction ledger 104 associated with respective node of the plurality of nodes 102a, ..., 102n.

At 498, the media content rights counter transaction, which comprises the alternative offer, may be received as the new media content rights response transaction to the first node 102b associated with the second initiating participant. In accordance with an embodiment, the first node 102b associated with the second initiating participant may be further configured to receive the media content rights counter transaction, which comprises the alternative offer, as the new media content rights response transaction to the first node 102b associated with the second initiating participant. The alternative grant offer may comprise at least supplemental media content rights, monetary value, a trade for existing media content rights, and/or statistical data.

At 499, an accept, reject, or counter may be chosen in response to the media content rights counter transaction received from the second node 102n associated with the second receiving participant. In accordance with an embodiment, the first node 102b associated with the second initiating participant may be further configured to choose an accept, reject, or counter in response to the media content rights counter transaction received from the second node 102n associated with the second receiving participant. Control passes back to 492 to iteratively execute the exemplary operations 492 to 499.

Figure 5:
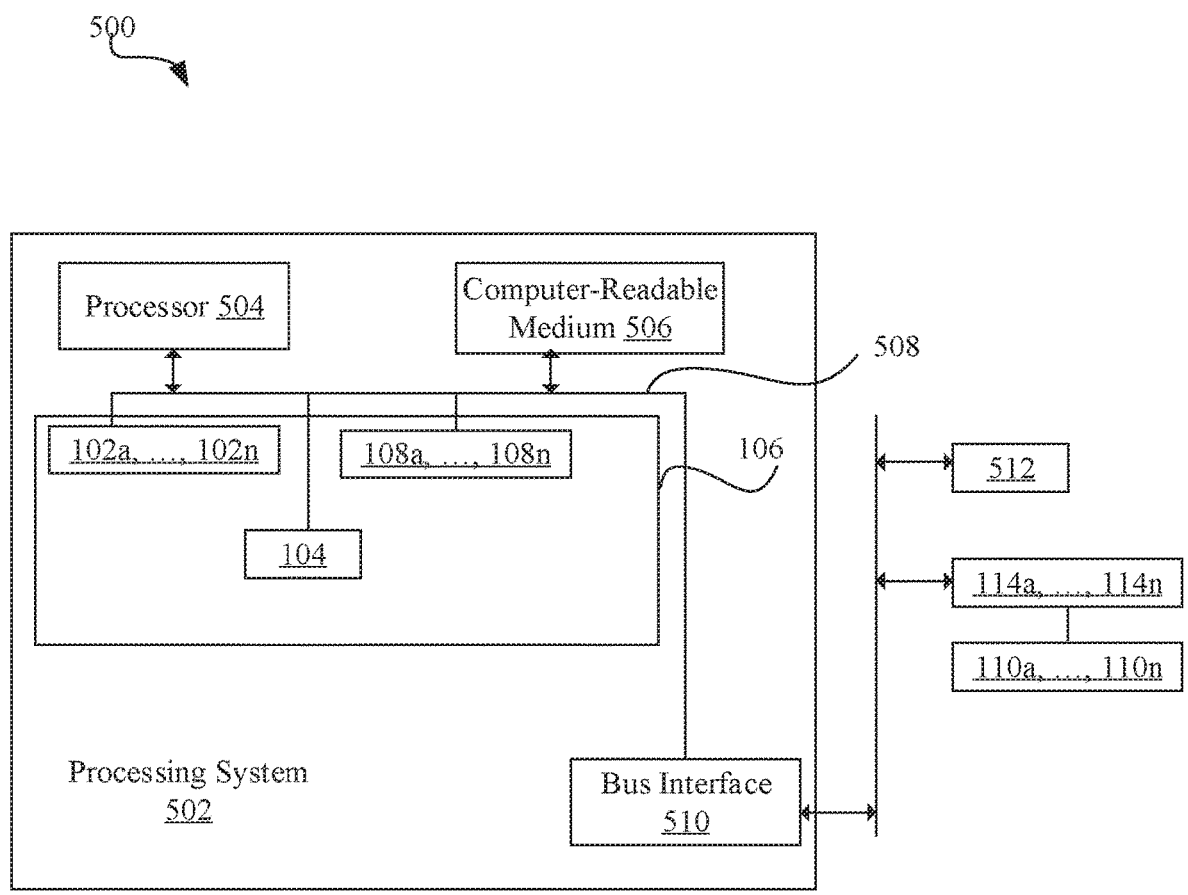
FIG. 5 is a conceptual diagram illustrating an example of a hardware implementation for a system employing a processing system for media content rights transferal based on a protocol for management of media content rights using a distributed media rights transaction ledger, in accordance with an exemplary embodiment of the disclosure.

FIG. 5 is a conceptual diagram illustrating an example of a hardware implementation for a system employing a processing system for media content rights transferal based on a protocol for management of media content rights using a distributed media rights transaction ledger, in accordance with an exemplary embodiment of the disclosure. Referring to FIG. 5, the hardware implementation shown by a representation 500 for the ecosystem 100 employs a processing system 502 for media content rights transferal based on a protocol for management of media content rights using a distributed media rights transaction ledger, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the plurality of nodes 102a, ..., 102n executing the plurality of media content rights transactions, the distributed media rights transaction ledger 104, and the plurality of entities 108a, ..., 108n, as described in detail in FIG. 1.

The hardware processor 504 may be configured to manage the bus 508 and general processing, including the execution of a set of instructions stored on the non-transitory computer-readable medium 506. The set of instructions, when executed by the hardware processor 504, causes the ecosystem 100 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be used for storing data that is manipulated by the hardware processor 504 when executing the set of instructions. The data is stored for short periods or in the presence of power. The non-transitory computer-readable medium 506 may also be configured to store data for the plurality of nodes 102a, ..., 102n, the distributed media rights transaction ledger 104, the plurality of entities 108a, ..., 108n, and the plurality of media content rights transactions. The non-transitory computer-readable medium 506 may have stored thereon, computer readable or executable instructions, which when executed by the processor 504, cause the processor 504 to execute the operation described herein for media content rights transferal based on a protocol for management of media content rights using a distributed media rights transaction ledger.

The bus 508 is configured to link together various circuits. In this example, the ecosystem 100 employing the processing system 502 and the non-transitory computer-readable medium 506 may be implemented with bus architecture, represented generally by bus 508. The bus 508 may include any number of interconnecting buses and bridges depending on the specific implementation of the ecosystem 100 and the overall design constraints. The bus interface 510 may be configured to provide an interface between the bus 508 and other circuits, such as, transceiver 512, and external devices, such as the plurality of consumer devices 114a, ..., 114n associated with respective content consumers of the plurality of content consumers 110a, ..., 110n.

The transceiver 512 may be configured to provide a communication of the communication network 106 with various other apparatuses, such as the plurality of consumer devices 114a, ..., 114n associated with respective content consumers of the plurality of content consumers 110a, ..., 110n, via the network 116. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments. For example, the plurality of nodes 102a, ..., 102n, the distributed media rights transaction ledger 104, the plurality of entities 108a, ..., 108n, and the plurality of media content rights transactions, may include software that may be executed across a single or multiple processing environments.

In an aspect of the disclosure, the hardware processor 504, the non-transitory computer-readable medium 506, or a combination of both may be configured or otherwise specially programmed to execute the operations or functionality of the plurality of nodes 102a, ..., 102n, the distributed media rights transaction ledger 104, the plurality of entities 108a, ..., 108n, and the plurality of media content rights transactions, or various other components described herein, as described with respect to FIGS. 1 to 4G.

Various embodiments of the disclosure comprise the ecosystem 100 for media content rights negotiation based on a protocol for management of media content rights transferal using the distributed media rights transaction ledger 104. In an embodiment, the ecosystem 100 may comprise a plurality of nodes 102a, ..., 102n configured to interact with each other in accordance with a defined protocol in the communication network 106. One of the first gateway node 102a or the first node 102b of the plurality of nodes 102a, ..., 102n, associated with one of a first initiating participant, such as the first content consumer 110a, or a second initiating participant, respectively, may be configured to receive a request or determine a need for media content rights transferal of a media content. An associated instance of the distributed media rights transaction ledger 104 may be traversed to determine an address of one of a second node 102n or a second gateway node 102m associated with at least an identifier of one of the first receiving participant, such as the second content consumer 110n, or the second receiving participant, such as the second content distributor entity 108n. Further, an initial media content rights transaction, which includes at least a transaction identifier that indicates a grant offer for the media content rights transferal, may be issued to one of the second node 102n or the second gateway node 102m.

One of the second gateway node 102m associated with the first receiving participant or the second node 102n associated with the second receiving participant, such as the second content distributor entity 108n, may be configured to issue a new media content rights response transaction based on verification, evaluation, and/or acceptance of the grant offer in the initial media content rights transaction. Based on the new media content rights response transaction, a media content rights transferal transaction is executed between one of the first initiating participant, such as the first content consumer 110a, or the second initiating participant, such as the first content distribution entity 108a, and one of the first receiving participant, such as the second content consumer 110n, or the second receiving participant, such as the second content distributor entity 108n. Further, a plurality of instances of the distributed media rights transaction ledger 104 may be associated with a respective node of the plurality of nodes 102a, ..., 102n. Each instance of the distributed media rights transaction ledger 104 may be appended with at least the initial media content rights transaction, the new media content rights response transaction, and/or the media content rights transferal transaction.

In accordance with an embodiment, the first initiating participant, the second initiating participant, the first receiving participant, and the second receiving participant, may correspond to the first content consumer 110a, the first content distributor entity 108a, the second content consumer 110n, and the second content distributor entity 108n, respectively.

In accordance with an embodiment, the first initiating participant, such as the first content consumer 110a, may transfer the media content rights of the media content to one of the first receiving participant, such as the second content consumer 110n, or the second receiving participant, such as the second content distributor entity 108n. Media content rights to the media content with a set of associated constraints may be secured and owned by one of the first initiating participant, such as the first content consumer 110a, or the second initiating participant, such as the first content distribution entity 108a. One of the first initiating participant, such as the first content consumer 110a, or the second initiating participant, such as the first content distribution entity 108a, with the media content rights may initiate the media content rights transferal.

In accordance with an embodiment, the first consumer device 114a associated with the first initiating participant, such as the first content consumer 110a, may be configured to connect to the first gateway node 102a to retrieve a set of media content for which media content rights are secured from the associated instance of the distributed media rights transaction ledger 104. The first consumer device 114a may further present the retrieved set of media content for which the media content rights are secured on the first consumer device 114a associated with the first initiating participant, such as the first content consumer 110a. The media content rights may correspond to one or more of playback media content rights, download media content rights, download media content rights, or the media content rights transferal.

In accordance with an embodiment, the first initiating participant, such as the first content consumer 110a, may issue the request for the media content rights transferal of the media content to one of the first receiving participant, such as the second content consumer 110n, or the second receiving participant, such as the second content distributor entity 108n. The request for the media content rights transferal issued to the first gateway node 102a may comprise at least identifiers associated with one of the first initiating participant, such as the first content consumer 110a, or the second initiating participant, such as the first content distribution entity 108a, the media content, a respective owner of the media content transferal rights, the first receiving participant, such as the second content consumer 110n, and the second receiving participant, such as the second content distributor entity 108n, retrieved from the distributed media rights transaction ledger 104.

In accordance with an embodiment, based on the request for the media content rights transferal, the first gateway node 102a may be further configured to traverse the associated instance of the distributed media rights transaction ledger 104 to determine that the first initiating participant, such as the first content consumer 110a, has active media content rights, or that one of the first initiating participant, such as the first content consumer 110a, or the second initiating participant, such as the first content distribution entity 108a, has a permission to transfer media content rights for the media content based on the set of associated constraints.

In accordance with an embodiment, the first gateway node 102a may be further configured to search for a media content rights transaction associated with the identifiers retrieved from the distributed media rights transaction ledger 104 for the determination that the first initiating participant, such as the first content consumer 110a, has active media content rights.

In accordance with an embodiment, the set of associated constraints may be defined by a set of negotiated media content rights. The set of associated constraints may comprise at least a time duration for length of the media content rights transferal, one or more restrictions associated with the first receiving participant, such as the second content consumer 110n, and the second receiving participant, such as the second content distributor entity 108n, a download or offline access, a condition whether initiating and receiving participants can leverage the media content simultaneously or if mutually exclusive media content rights transferal is permitted where only one of the initiating or receiving participants can leverage the media content at a given time, playback frequency limits, and restrictions and quality level related to a second consumer device 114n.

In accordance with an embodiment, the first gateway node 102a may be further configured to present the set of associated constraints of the media content rights transferal associated with one of the first receiving participant, such as the second content consumer 110n, or the second receiving participant, such as the second content distributor entity 108n, to one of the first initiating participant, such as the first content consumer 110a, or the second initiating participant, such as the first content distribution entity 108a. The associated instance of the distributed media rights transaction ledger 104 may be traversed to determine the address of one of the second node 102n or the second gateway node 102m associated with at least the identifier of one of the first receiving participant, such as the second content consumer 110n, or the second receiving participant, such as the second content distributor entity 108n, based on acceptance of the set of associated constraints by one of the first initiating participant, such as the first content consumer 110a, or the second initiating participant, such as the first content distribution entity 108a.

In accordance with an embodiment, the initial media content rights transaction may further include identifiers associated with one or more of the first initiating participant, such as the first content consumer 110a, or the second initiating participant, such as the first content distribution entity 108a, the media content, media content transferal rights owner, the first receiving participant, such as the second content consumer 110n, or the second receiving participant, such as the second content distributor entity 108n, parameters associated with a specific media content rights transferal, a cryptographic identifier of media content rights transaction data that can be referenced by another media content rights transaction, cryptographically signed by the first initiating participant, such as the first content consumer 110a, or the second initiating participant, such as the first content distribution entity 108a.

In accordance with an embodiment, based on the initial media content rights transaction, one of the second gateway node 102m or the second node 102n, may be further configured to validate authenticity of the request for the media content rights transferal based on verification of cryptographic signature of one of the first initiating participant, such as the first content consumer 110a, or the second initiating participant, such as the first content distribution entity 108a. One of the second gateway node 102m or the second node 102n may further validate that one of the first receiving participant, such as the second content consumer 110n, and the second receiving participant, such as the second content distributor entity 108n, can accept the request for the media content rights transferal based on a confirmation that the set of associated constraints is non-conflicting against one of the first initiating participant, such as the first content consumer 110a, or the second initiating participant, such as the first content distribution entity 108a.

In accordance with an embodiment, the new media content rights response transaction may include one or more of a media content rights transaction that indicates a response to the grant offer cryptographically signed by the first receiving participant, such as the second content consumer 110n, or the second receiving participant, such as the second content distributor entity 108n, to verify authenticity of the new media content rights response transaction, an acceptance response value or a reject response value, a counter offer, or a cryptographic identifier of the new media content rights response transaction for being referenced by another media content rights transaction.

In accordance with an embodiment, based on a receipt of the new media content rights response transaction, the first gateway node 102a may be further configured to validate authenticity of the request for the media content rights transferal based on verification of cryptographic signature of one of the first initiating participant, such as the first content consumer 110a, or the second initiating participant, such as the first content distribution entity 108a. The first gateway node 102a may be further configured to append new media content rights response transaction data to the associated instance of the distributed media rights transaction ledger 104 based on the acceptance response value in the new media content rights response transaction. The first gateway node 102a may be further configured to broadcast the appended new media content rights response transaction data to the plurality of nodes 102a, . . . , 102n on the communication network 106.

In accordance with an embodiment, the first gateway node 102a may be further configured to inform a first consumer device 114a that media content rights transferal is declined based on the rejection response value in the new media content rights response transaction.

In accordance with an embodiment, the second initiating participant, such as the first content distribution entity 108a, may transfer the media content rights of the media content to the first receiving participant, such as the second content consumer 110n. The media content rights to the media content with a set of associated constraints may be secured by the second initiating participant, such as the first content distribution entity 108a. The first receiving participant, such as the second content consumer 110n, or the second receiving participant, such as the second content distributor entity 108n, may generate the request for the media content rights transferal from the first initiating participant, such as the first content consumer 110a, or the second initiating participant, such as the first content distribution entity 108a, with the media content rights to the media content or elects for the media content rights transferal to the second receiving participant, such as the second content distributor entity 108n.

In accordance with an embodiment, the request for the media content rights transferal may be a direct request from the first receiving participant, such as the second content consumer 110n. The direct request may comprise information associated with one of the first initiating participant, such as the first content consumer 110a, or the second initiating participant, such as the first content distribution entity 108a, the media content, and an owner of the media content transferal rights, based on the associated instance of the distributed media rights transaction ledger 104.

In accordance with an embodiment, the first node 102b associated with the second initiating participant, such as the first content distribution entity 108a, may be further configured to search for a media content rights transaction associated with the media content or identifier of an owner of the media content transferal rights retrieved from the distributed media rights transaction ledger 104 for determination that the second initiating participant, such as the first content distribution entity 108a, has active media content rights.

In accordance with an embodiment, the set of associated constraints may be defined by a set of negotiated media content rights. The set of associated constraints may comprise at least a time duration for length of the media content rights transferal, one or more restrictions associated with the first receiving participant, such as the second content consumer 110n, a download or offline access, a condition whether one of the first initiating participant, such as the first content consumer 110a, or the second initiating participant, such as the first content distribution entity 108a, and the first receiving participant, such as the second content consumer 110n, can leverage the media content simultaneously or if mutually exclusive media content rights transferal is permitted where only one of the first initiating participant, such as the first content consumer 110a, or the second initiating participant, such as the first content distribution entity 108a, and the first receiving participant, such as the second content consumer 110n, can leverage the media content at a given time, playback frequency limits, and restrictions and quality level related to a second consumer device 114n.

In accordance with an embodiment, the first node 102b associated with the second initiating participant, such as the first content distribution entity 108a, may be further configured to distribute the request for the media content rights transferal to one or more nodes of the plurality of nodes 102a, . . . , 102n associated with the second initiating participant, such as the first content distribution entity 108a, when the first node 102b fails to process the request.

In accordance with an embodiment, based on the initial media content rights transaction, the second gateway node 102m associated with the first receiving participant, such as the second content consumer 110n, may be further configured to validate authenticity of the request for the media content rights transferal based on verification of cryptographic signature of one of the first initiating participant, such as the first content consumer 110a, or the second initiating participant, such as the first content distribution entity 108a. The second gateway node 102m may be further configured to validate that one of the first receiving participant, such as the second content consumer 110n, or the second receiving participant, such as the second content distributor entity 108n, can accept the request for the media content rights transferal based on a confirmation that the set of associated constraints is non-conflicting against the second initiating participant, such as the first content distribution entity 108a. The second gateway node 102m may be further configured to present one or more options to the first receiving participant, such as the second content consumer 110n, to respond to the issued new media content rights response transaction, wherein the one or more options for the issued new media content rights response transaction is one of an acceptance, a rejection or a counter of the grant offer for the media content rights transferal.

In accordance with an embodiment, based on the rejection of the grant offer for the media content rights transferal by the first receiving participant, such as the second content consumer 110n, the second gateway node 102m may be further configured to issue a rejection media content rights transaction as the new media content rights response transaction to the first node 102b associated with the second initiating participant, such as the first content distribution entity 108a.

In accordance with an embodiment, based on the rejection media content rights transaction, the second initiating participant, such as the first content distribution entity 108a, may cease to negotiate with the first receiving participant, such as the second content consumer 110n, for the media content rights transferal.

In accordance with an embodiment, based on the acceptance of the grant offer for the media content rights transferal by the first receiving participant, the second gateway node 102m may be configured to issue an acceptance media content rights transaction as the new media content rights response transaction to the first node 102b associated with the second initiating participant, such as the first content distribution entity 108a. New media content rights response transaction data may be broadcasted to the plurality of nodes 102a, . . . , 102n in the communication network 106 and appended in the plurality of instances of the distributed media rights transaction ledger 104 associated with the respective node of the plurality of nodes 102a, . . . , 102n. The new media content rights response transaction data may comprise at least a summary of exchange of media content rights transactions between one of the second gateway node 102m or the second node 102n and the first node 102b.

In accordance with an embodiment, based on the grant offer for the media content rights transferal countered by the first receiving participant, such as the second content consumer 110n, the second gateway node 102m may be configured to further accept, reject or counter the counter of the grant offer.

In accordance with an embodiment, the second initiating participant, such as the first content distribution entity 108a, may transfer the media content rights of the media content to the second receiving participant, such as the second content distributor entity 108n. Media content rights to the media content with the set of associated constraints may be secured and owned by the second initiating participant, such as the first content distribution entity 108a. The second receiving participant, such as the second content distributor entity 108n, may generate the request for the media content rights transferal for the second initiating participant, such as the first content distribution entity 108a, or the second initiating participant, such as the first content distribution entity 108a, with the media content rights or elects for the media content rights transferal to the second receiving participant, such as the second content distributor entity 108n.

In accordance with an embodiment, the second initiating participant, such as the first content distribution entity 108a, may determine a requirement for the media content rights transferal for redistribution of the media content.

In accordance with an embodiment, the determination of the requirement for the media content rights transferal and/or the received request for the media content rights transferal may be based on information associated with one or more factors. For example, consumption history of a first content consumer or a group of content consumers, wherein the consumption history is retrieved from the associated instance of the distributed media rights transaction ledger 104, historical media content rights acquisition for a content consumer or a group of content consumers, wherein the information associated with historical content rights acquisition is retrieved from the associated instance of the distributed media rights transaction ledger 104, historical media content rights acquisition for an entity or entities, wherein the information associated with the historical media content rights acquisition for the entity or entities is retrieved from the associated instance of the distributed media rights transaction ledger 104, and historical media content rights acquisition from an entity or entities, wherein the information associated with the historical media content rights acquisition for the entity or entities is retrieved from the associated instance of the distributed media rights transaction ledger 104.

In accordance with an embodiment, the determination of the requirement for the media content rights transferal and/or the received request for the media content rights may be based on a request for the media content rights received from at least a participant associated with a consumer device or a presence of the media content in a programming schedule of the first node 102b. The consumer device may be communicably coupled to the first node 102b in the communication network 106.

In accordance with an embodiment, the determination of the requirement for the media content rights transferal and/or the received request for the media content rights transferal may be based on one or more of a statistical analysis of a content consumer or consumers consumption habits, and/or historical pricing for at least the content consumers and/or a plurality of initiating and receiving entities, and a predictive model to anticipate demand for the requested media content. The anticipated demand for the media content may be based on one or more of a significant world event, a popularity change of a public figure, another popularity change of a subject matter, cultural influences, social and societal trends, demographics, a release or future release of alternative or related media content, a program schedule of an entity, and/or on-demand user requests.

In accordance with an embodiment, the initial media content rights transaction may further include identifiers associated with the second initiating participant, such as the first content distribution entity 108a, the media content, media content transferal rights owner, the second receiving participant, such as the second content distributor entity 108n, parameters associated with a specific media content rights transferal, a cryptographic identifier of media content rights transaction data that can be referenced by another media content rights transaction, cryptographically signed by the first initiating participant, such as the first content consumer 110a, or the second initiating participant, such as the first content distribution entity 108a In accordance with an embodiment, the grant offer for corresponding media content rights included in the initial media content rights transaction may comprise one or more of a monetary value, a trade for existing media content rights, and/or statistical data to be used for the evaluation of the grant offer by the second receiving participant, such as the second content distributor entity 108n, In accordance with an embodiment, the initial media content rights transaction between the first node 102b associated with the second initiating participant, such as the first content distribution entity 108a, and the second node 102n associated with the second receiving participant, such as the second content distributor entity 108n, may not be broadcasted to remaining nodes of the plurality of nodes 102a, . . . , 102n in the communication network 106.

In accordance with an embodiment, the initial media content rights transaction between the first node 102b associated with the second initiating participant, such as the first content distribution entity 108a, and the second node 102n associated with the second receiving participant, such as the second content distributor entity 108n, may be re-broadcasted to defined nodes associated with the second initiating participant, such as the first content distribution entity 108a, and the second receiving participant, such as the second content distributor entity 108n, to maintain synchronization.

In accordance with an embodiment, for the issuance of the new media content rights response transaction, the second node 102n associated with the second receiving participant, such as the second content distributor entity 108n, may be configured to determine the new media content rights response transaction based on a verification, evaluation, and/or acceptance of the grant offer, upon a receipt of the initial media content rights transaction issued by the second initiating participant, such as the first content distribution entity 108a. The issued new media content rights response transaction may be one of a media content rights accept transaction, a media content rights reject transaction, or a media content rights counter transaction.

In accordance with an embodiment, the second node 102n associated with the second receiving participant, such as the second content distributor entity 108n, may be further configured to reject the grant offer for the media content rights transferal, and issue the media content rights reject transaction as the new media content rights response transaction to the second node 102n associated with the second initiating participant, such as the first content distribution entity 108a.

In accordance with an embodiment, based on the media content rights reject transaction issued by the second node 102n associated with the second receiving participant, such as the second content distributor entity 108n, the first node 102b associated with the second initiating participant, such as the first content distribution entity 108a, may be further configured to cease to negotiate with the second node 102n associated with the second receiving participant, such as the second content distributor entity 108n, for current session. The first node 102b may further negotiate with nodes associated with participants other than the first node 102b.

In accordance with an embodiment, the second node 102n associated with the second receiving participant, such as the second content distributor entity 108n, may be further configured to accept the grant offer for the media content rights transferal. The second node 102n may issue the media content rights accept transaction as the new media content rights response transaction to the first node 102b associated with the second initiating participant, such as the first content distribution entity 108a.

In accordance with an embodiment, based on the media content rights accept transaction issued by the second node 102n associated with the second receiving participant, such as the second content distributor entity 108n, the first node 102b associated with the second initiating participant, such as the first content distribution entity 108a, may be further configured to issue one or more other media content rights rejection transactions to one or more nodes other than the second receiving participant, such as the second content distributor entity 108n, for current session.

In accordance with an embodiment, based on the media content rights accept transaction, the second node 102n associated with the second receiving participant, such as the second content distributor entity 108n, may be further configured to broadcast the new media content rights response transaction to the plurality of nodes 102a, . . . , 102n in the communication network 106. The new media content rights response transaction may comprise at least an encrypted summary of exchange of one or more other new media content rights response transactions issued between nodes associated with the first initiating participant, such as the first content consumer 110a, and the second node 102n associated with the second receiving participant, such as the second content distributor entity 108n, such that a summary can be decrypted by the first node 102b associated with the second initiating participant, such as the first content distribution entity 108a, and the second node 102n associated with the second receiving participant, such as the second content distributor entity 108n, In accordance with an embodiment, the new media content rights response transaction may be appended to the plurality of instances of the distributed media rights transaction ledger 104 associated with respective node of the plurality of nodes 102a, . . . , 102n.

In accordance with an embodiment, the second node 102n associated with the second receiving participant, such as the second content distributor entity 108n, may be further configured to counter the grant offer for corresponding media content rights for an alternative grant offer. The alternative grant offer may comprise at least supplemental media content rights, monetary value, a trade for existing media content rights, and/or statistical data. The second node 102n may further issue the media content rights counter transaction, which comprises the alternative grant offer, as the new media content rights response transaction to the first node 102b associated with the second initiating participant, such as the first content distribution entity 108a.

In accordance with an embodiment, based on the media content rights counter transaction, the second initiating participant, such as the first content distribution entity 108a, may be further configured to choose to accept, reject, or counter in response to the media content rights counter transaction received from the second node 102n associated with the second receiving participant, such as the second content distributor entity 108n, Various embodiments of the disclosure may provide a computer-readable medium, such as the non-transitory computer-readable medium 506, having stored thereon, computer-implemented instruction that when executed by the processor 504 causes the ecosystem 100 for media content rights transferal based on a protocol for management of media content rights using the distributed media rights transaction ledger 104. In accordance with an embodiment, the processor 504 causes the ecosystem 100 to execute operations for the plurality of nodes 102a, . . . , 102n configured to interact with each other in accordance with a defined protocol in the communication network 106. One of the first gateway node 102a or the first node 102b of the plurality of nodes 102a, . . . , 102n, associated with one of a first initiating participant, such as the first content consumer 110a, or a second initiating participant, respectively, may be configured to receive a request or determine a need for media content rights transferal of a media content. An associated instance of the distributed media rights transaction ledger 104 may be traversed to determine an address of one of a second node 102n or a second gateway node 102m associated with at least an identifier of one of the first receiving participant, such as the second content consumer 110n, or the second receiving participant, such as the second content distributor entity 108n. Further, an initial media content rights transaction, which includes at least a transaction identifier that indicates a grant offer for the media content rights transferal, may be issued to one of the second node 102n or the second gateway node 102m.

One of the second gateway node 102m associated with the first receiving participant or the second node 102n associated with the second receiving participant, such as the second content distributor entity 108n, may be configured to issue a new media content rights response transaction based on verification, evaluation, and/or acceptance of the grant offer in the initial media content rights transaction. Based on the new media content rights response transaction, a media content rights transferal transaction is executed between one of the first initiating participant, such as the first content consumer 110a, or the second initiating participant, such as the first content distribution entity 108a, and one of the first receiving participant, such as the second content consumer 110n, or the second receiving participant, such as the second content distributor entity 108n. Further, a plurality of instances of the distributed media rights transaction ledger 104 may be associated with a respective node of the plurality of nodes 102a, . . . , 102n. Each instance of the distributed media rights transaction ledger 104 may be appended with at least the initial media content rights transaction, the new media content rights response transaction, and/or the media content rights transferal transaction.

Managing the media content rights of millions of media assets, by thousands of content owners, content distributors, and tracking a flow of content rights from one entity to other entity, in a secure manner is a herculean task. Currently, media content rights clearance and transferal are very time consuming, and backed by inaccessible/usable data. Further, multiple content libraries by various entities, require separate subscriptions and make it difficult for users to navigate to content of their choice freely without having individual subscription. Further, third party measurement of viewership of a content item, are costly. Further, isolated content catalogs and third-party dependencies to estimate viewership for a content item, such as a TV show, to plan for future advertisement inventory needs and obligations, increase complexities. This in turn increases re-work and requires installation of large infrastructures and resources to maintain uninterrupted content delivery for existing channel and limits the ability of the broadcast or network provider to change content, provide customized content in real time or near-real time.

The disclosed system and method for dynamic transferal, re-distribution, enforcement, and tracking of content rights of media content, has several advantages, for example, a) Providing tokenized and secure content licenses for a media content; b) Ease-of-use and sharing of catalogs, revenue, content rights makes pirating unjustified; c) content distributors are able to dynamically transfer rights from content owners to the consumers in real time or near real-time; d) instant user-targeted catalogs may be identified and prepared and pushed to apps, such as a mobile app or a TV app, at consumer devices; e) the ecosystem provides a platform for creation of a marketplace where new media markets, such as a content trading market may emerge; f) content development is user-driven/user-funded; g) digital currency, for example, digital crypto-currencies, may be used easily in network due to the inherent framework of network; h) enables instant settlements using the distributed media rights transaction ledger; and i) simplified, secured, real time, ensured, and fail-safe tracking of media content rights among various participants of the ecosystem 100. Thus, the disclosed new and advanced ecosystem provide dynamic and on-the-fly media content rights transferal transactions for media content rights and contractual obligations to provide new and customized media content offerings in a cost-effective manner and enhanced viewer experience to reinvigorate the digital media and television content broadcasting industry.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made, and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
a plurality of processors, wherein the plurality of processors comprises a plurality of nodes,
wherein one of a first gateway node or a first node of the plurality of nodes is configured to interact with one of a second node or a second gateway node based on a defined protocol in a communication network,
wherein one of the first gateway node or the first node of the plurality of nodes, associated with one of a first initiating participant or a second initiating participant, respectively, is configured to:
receive a request or determine a need for media content rights transferal of a media content;
traverse an associated instance of a distributed media rights transaction ledger to determine an address of one of the second node or the second gateway node associated with at least an identifier of one of a first receiving participant or a second receiving participant;
issue an initial media content rights transaction, which includes at least a transaction identifier that indicates a grant offer for the media content rights transferal, to one of the second node or the second gateway node;
wherein one of the second gateway node associated with the first receiving participant or the second node associated with the second receiving participant is configured to:
issue a new media content rights response transaction based on verification, evaluation, and/or acceptance of the grant offer in the initial media content rights transaction,
wherein based on the new media content rights response transaction, a media content rights transferal transaction is executed between one of the first initiating participant or the second initiating participant and one of the first receiving participant or the second receiving participant; and
validate authenticity of the request for the media content rights transferal based on verification of cryptographic signature of one of the first initiating participant or the second initiating participant; and
a plurality of storage devices, wherein each storage device of the plurality of storage devices is configured to store at least the initial media content rights transaction and the new media content rights response transaction in an instance of a plurality of instances of the distributed media rights transaction ledger associated with a respective node of the plurality of nodes,
wherein each instance of the distributed media rights transaction ledger is appended with at least the initial media content rights transaction, the new media content rights response transaction, and/or the media content rights transferal transaction.

2. The system of claim 1, wherein the first initiating participant, the second initiating participant, the first receiving participant, and the second receiving participant correspond to a first content consumer, a first content distributor entity, a second content consumer, and a second content distributor entity, respectively.

3. The system of claim 1, wherein the first initiating participant transfers the media content rights of the media content to one of the first receiving participant or the second receiving participant,
wherein media content rights to the media content with a set of associated constraints are secured and owned by one of the first initiating participant or the second initiating participant, and
wherein one of the first initiating participant or the second initiating participant with the media content rights initiates the media content rights transferal.

4. The system of claim 3, wherein a first consumer device associated with the first initiating participant is configured to:
connect to the first gateway node to retrieve a set of media content for which media content rights are secured from the associated instance of the distributed media rights transaction ledger; and
present the retrieved set of media content for which the media content rights are secured on the first consumer device associated with the first initiating participant, wherein the media content rights correspond to one or more of playback media content rights, download media content rights, distribution of media content rights, or the media content rights transferal.

5. The system of claim 4, wherein the first initiating participant issues the request for the media content rights transferal of the media content to one of the first receiving participant or the second receiving participant, and
wherein the request for the media content rights transferal issued to the first gateway node comprises at least identifiers associated with one of the first initiating participant or the second initiating participant, the media content, a respective owner of the media content transferal rights, the first receiving participant and the second receiving participant retrieved from the distributed media rights transaction ledger.

6. The system of claim 5, wherein, based on the request for the media content rights transferal, the first gateway node is further configured to traverse the associated instance of the distributed media rights transaction ledger to determine that the first initiating participant has active media content rights, and/or that one of the first initiating participant or the second initiating participant has a permission to transfer media content rights for the media content based on the set of associated constraints.

7. The system of claim 6, wherein the first gateway node is further configured to search for a media content rights transaction associated with the identifiers retrieved from the distributed media rights transaction ledger for the determination that the first initiating participant has active media content rights.

8. The system of claim 6, wherein the set of associated constraints are defined by a set of negotiated media content rights, and
wherein the set of associated constraints comprises at least a time duration for length of the media content rights transferal, one or more restrictions associated with the first receiving participant and the second receiving participant, a download or offline access, a condition whether initiating and receiving participants can leverage the media content simultaneously or if mutually exclusive media content rights transferal is permitted where only one of the initiating or receiving participants can leverage the media content at a given time, playback frequency limits, and restrictions and quality level related to a second consumer device.

9. The system of claim 6, wherein the first gateway node is further configured to:
present the set of associated constraints of the media content rights transferal associated with one of the first receiving participant or the second receiving participant to one of the first initiating participant or the second initiating participant, and
wherein the associated instance of the distributed media rights transaction ledger is traversed to determine the address of one of the second node or the second gateway node associated with at least the identifier of one of the first receiving participant or the second receiving participant based on acceptance of the set of associated constraints by one of the first initiating participant or the second initiating participant.

10. The system of claim 1, wherein the initial media content rights transaction further includes identifiers associated with one or more of the first initiating participant or the second initiating participant, the media content, media content transferal rights owner, the first receiving participant or the second receiving participant, parameters associated with a specific media content rights transferal, a cryptographic identifier of media content rights transaction data that can be referenced by another media content rights transaction, cryptographically signed by the first initiating participant or the second initiating participant.

11. The system of claim 3, wherein, based on the initial media content rights transaction, one of the second gateway node or the second node, the second gateway node being associated with the first receiving participant, is further configured to:
validate that one of the first receiving participant and the second receiving participant can accept the request for the media content rights transferal based on a confirmation that the set of associated constraints is non-conflicting against one of the first initiating participant or the second initiating participant.

12. The system of claim 3, wherein the new media content rights response transaction may include one or more of a media content rights transaction that indicates a response to the grant offer cryptographically signed by the first receiving participant or the second receiving participant to verify the authenticity of the new media content rights response transaction, an acceptance response value or a reject response value, a counter offer, or a cryptographic identifier of the new media content rights response transaction for being referenced by another media content rights transaction.

13. The system of claim 12, wherein, based on a receipt of the new media content rights response transaction, the first gateway node is further configured to:
append new media content rights response transaction data to the associated instance of the distributed media rights transaction ledger based on the acceptance response value in the new media content rights response transaction; and
broadcast the appended new media content rights response transaction data to the plurality of nodes on the communication network.

14. The system of claim 12, wherein the first gateway node is further configured to inform a first consumer device that media content rights transferal is declined based on the rejection response value in the new media content rights response transaction.

15. The system of claim 1, wherein the second initiating participant transfers the media content rights of the media content to the first receiving participant,
wherein media content rights to the media content with a set of associated constraints are secured by the second initiating participant,
wherein the first receiving participant or the second receiving participant generates the request for the media content rights transferal from the first initiating participant or the second initiating participant with the media content rights to the media content or elects for the media content rights transferal to the second receiving participant.

16. The system of claim 15, wherein the request for the media content rights transferal is a direct request from the first receiving participant, and
wherein the direct request comprises information associated with one of the first initiating participant or the second initiating participant, the media content, and a respective owner of the media content transferal rights, based on the associated instance of the distributed media rights transaction ledger.

17. The system of claim 15, wherein the gateway node associated with the second initiating participant is further configured to search for a media content rights transaction associated with the media content or identifier of an owner of the media content transferal rights retrieved from the distributed media rights transaction ledger for determination that the second initiating participant has active media content rights.

18. The system of claim 17, wherein the set of associated constraints are defined by a set of negotiated media content rights, and
wherein the set of associated constraints comprises at least a time duration for length of the media content rights transferal, one or more restrictions associated with the first receiving participant, a download or offline access, a condition whether one of the first initiating participant or the second initiating participant and the first receiving participant can leverage the media content simultaneously or if mutually exclusive media content rights transferal is permitted where only one of the first initiating participant or the second initiating participant and the first receiving participant can leverage the media content at a given time, playback frequency limits, and restrictions and quality level related to a second consumer device.

19. The system of claim 1, wherein the first node associated with the second initiating participant is further configured to distribute the request for the media content rights transferal to one or more nodes of the plurality of nodes associated with the second initiating participant when the first node fails to process the request.

20. The system of claim 1, wherein, based on the initial media content rights transaction, the second gateway node associated with the first receiving participant, is further configured to:
validate that one of the first receiving participant or the second receiving participant can accept the request for the media content rights transferal based on a confirmation that a set of associated constraints is non-conflicting against the second initiating participant; and
present one or more options to the first receiving participant to respond to the issued new media content rights response transaction, wherein the one or more options for the issued new media content rights response transaction is one of an acceptance, a rejection or a countering of the grant offer for the media content rights transferal.

21. The system of claim 20, wherein, based on the rejection of the grant offer for the media content rights transferal by the first receiving participant, the second gateway node may be configured to issue a rejection media content rights transaction as the new media content rights response transaction to the first node associated with the second initiating participant.

22. The system of claim 21, wherein, based on the rejection media content rights transaction, the second initiating participant ceases to negotiate with the first receiving participant for the media content rights transferal.

23. The system of claim 20, wherein, based on the acceptance of the grant offer for the media content rights transferal by the first receiving participant, the second gateway node may be configured to:
issue an acceptance media content rights transaction as the new media content rights response transaction to the first node associated with the second initiating participant,
wherein new media content rights response transaction data is broadcasted to the plurality of nodes in the communication network and appended in the plurality of instances of the distributed media rights transaction ledger associated with the respective node of the plurality of nodes, and
wherein the new media content rights response transaction data comprises at least a summary of exchange of media content rights transactions between one of the second gateway node or the second node and the first node.

24. The system of claim 20, wherein, based on the countering of the grant offer for the media content rights transferal by the first receiving participant, the second gateway node may be configured to further accept, reject or counter the counter of the grant offer.

25. The system of claim 1, wherein the second initiating participant transfers the media content rights of the media content to the second receiving participant,
wherein media content rights to the media content with a set of associated constraints are secured and owned by the second initiating participant, and
wherein the second receiving participant generates the request for the media content rights transferal for the second initiating participant, or the second initiating participant with the media content rights or elects for the media content rights transferal to the second receiving participant.

26. The system of claim 25, wherein the second initiating participant determines a requirement for the media content rights transferal for redistribution of the media content.

27. The system of claim 26, wherein the determination of the requirement for the media content rights transferal and/or the received request for the media content rights transferal is based on information associated with one or more of:
consumption history of a first content consumer or a group of content consumers, wherein the consumption history is retrieved from the associated instance of the distributed media rights transaction ledger,
historical media content rights acquisition for a content consumer or a group of content consumers, wherein the information associated with historical content rights acquisition is retrieved from the associated instance of the distributed media rights transaction ledger,
historical media content rights acquisition for an entity or entities, wherein the information associated with the historical media content rights acquisition for the entity or entities is retrieved from the associated instance of the distributed media rights transaction ledger, and
historical media content rights acquisition from an entity or entities, wherein the information associated with the historical media content rights acquisition for the entity or entities is retrieved from the associated instance of the distributed media rights transaction ledger.

28. The system of claim 26, wherein the determination of the requirement for the media content rights transferal and/or the received request for the media content rights is based on a request for the media content rights received from at least a participant associated with a consumer device or a presence of the media content in a programming schedule of the first node, and
wherein the consumer device is communicably coupled to the first node in the communication network.

29. The system of claim 26, wherein the determination of the requirement for the media content rights transferal and/or the received request for the media content rights transferal is based on one or more of:
a statistical analysis of a content consumer or consumers consumption habits, and/or historical pricing for at least the content consumers and/or a plurality of initiating and receiving entities, a predictive model to anticipate demand for the requested media content,
wherein the anticipated demand for the media content is based on one or more of a significant world event, a popularity change of a public figure, another popularity change of a subject matter, cultural influences, social and societal trends, demographics, a release or future release of alternative or related media content, a program schedule of an entity, and/or on-demand user requests.

30. The system of claim 25, wherein the initial media content rights transaction further includes identifiers associated with the second initiating participant, the media content, media content transferal rights owner, the second receiving participant, parameters associated with a specific media content rights transferal, a cryptographic identifier of media content rights transaction data that can be referenced by another media content rights transaction, cryptographically signed by the first initiating participant or the second initiating participant.

31. The system of claim 1, wherein the grant offer for corresponding media content rights included in the initial media content rights transaction comprises one or more of a monetary value, a trade for existing media content rights, and/or statistical data to be used for the evaluation of the grant offer by the second receiving participant.

32. The system of claim 25, wherein the initial media content rights transaction between the first node associated with the second initiating participant and the second node associated with the second receiving participant is not broadcasted to remaining nodes of the plurality of nodes in the communication network.

33. The system of claim 32, wherein the initial media content rights transaction between the first node associated with the second initiating participant and the second node associated with the second receiving participant is re-broadcasted to defined nodes associated with the second initiating participant and the second receiving participant to maintain synchronization.

34. The system of claim 1, wherein, for the issuance of the new media content rights response transaction, the second node associated with the second receiving participant is configured to determine the new media content rights response transaction based on a verification, evaluation, and/or acceptance of the grant offer, upon a receipt of the initial media content rights transaction issued by the second initiating participant, and
wherein the issued new media content rights response transaction is one of a media content rights accept transaction, a media content rights reject transaction, or a media content rights counter transaction.

35. The system of claim 34, wherein the second node associated with the second receiving participant is further configured to:
reject the grant offer for the media content rights transferal; and
issue the media content rights reject transaction as the new media content rights response transaction to the second node associated with the second initiating participant.

36. The system of claim 34, wherein, based on the media content rights reject transaction issued by the second node associated with the second receiving participant, the first node associated with the second initiating participant is further configured to:

cease to negotiate with the second node associated with the second receiving participant for current session; and
initiate to negotiate with nodes associated with participants other than the first node.

37. The system of claim 34, wherein the second node associated with the second receiving participant is further configured to:
accept the grant offer for the media content rights transferal; and
issue the media content rights accept transaction as the new media content rights response transaction to the first node associated with the second initiating participant.

38. The system of claim 37, wherein, based on the media content rights accept transaction issued by the second node associated with the second receiving participant, the first node associated with the second initiating participant is further configured to:
issue one or more other media content rights rejection transactions to one or more nodes other than the second receiving participant for current session.

39. The system of claim 34, wherein, based on the media content rights accept transaction, the second node associated with the second receiving participant may be further configured to broadcast the new media content rights response transaction to the plurality of nodes in the communication network, and
wherein the new media content rights response transaction comprises at least an encrypted summary of exchange of one or more other new media content rights response transactions issued between nodes associated with the first initiating participant and the second node associated with the second receiving participant, such that a summary can be decrypted by the first node associated with the second initiating participant and the second node associated with the second receiving participant.

40. The system of claim 34, wherein the new media content rights response transaction is appended to the plurality of instances of the distributed media rights transaction ledger associated with respective node of the plurality of nodes.

41. The system of claim 34, wherein the second node associated with the second receiving participant is further configured to:
counter the grant offer for corresponding media content rights for an alternative grant offer, and
wherein the alternative grant offer comprises at least supplemental media content rights, monetary value, a trade for existing media content rights, and/or statistical data; and
issue the media content rights counter transaction, which comprises the alternative grant offer, as the new media content rights response transaction to the first node associated with the second initiating participant.

42. The system of claim 41, wherein based on the media content rights counter transaction, the second initiating participant is further configured to choose to accept, reject, or counter in response to the media content rights counter transaction received from the second node associated with the second receiving participant.

43. A method, comprising:
receiving, by one of a first gateway node or a first node of a plurality of nodes, associated with one of a first initiating participant or a second initiating participant, respectively, a request or determine a need for media content rights transferal of a media content, wherein one of the first gateway node or the first node of the plurality of nodes is configured to interact with one of a second node or a second gateway node based on a defined protocol in a communication network;

traversing, by one of the first gateway node or the first node of the plurality of nodes, associated with one of the first initiating participant or the second initiating participant, respectively, an associated instance of a distributed media rights transaction ledger to determine an address of one of the second node or the second gateway node associated with at least an identifier of one of a first receiving participant or a second receiving participant;

issuing, by one of the first gateway node or the first node of the plurality of nodes, associated with one of the first initiating participant or the second initiating participant, respectively, an initial media content rights transaction, which includes at least a transaction identifier that indicates a grant offer for the media content rights transferal, to one of the second node or the second gateway node;

issuing, by one of the second gateway node associated with the first receiving participant or the second node associated with the second receiving participant, a new media content rights response transaction based on verification, evaluation, and/or acceptance of the grant offer in the initial media content rights transaction,
wherein based on the new media content rights response transaction, a media content rights transferal transaction is executed between one of the first initiating participant or the second initiating participant and one of the first receiving participant or the second receiving participant; and validating, by one of the second gateway node or the second node, the second gateway node being associated with the first receiving participant, authenticity of the request for the media content rights transferal based on verification of cryptographic signature of one of the first initiating participant or the second initiating participant,
wherein each instance of a plurality of instances of the distributed media rights transaction ledger is associated with a respective node of the plurality of nodes, and
wherein each instance of the distributed media rights transaction ledger is appended with at least the initial media content rights transaction, the new media content rights response transaction, and/or the media content rights transferal transaction.

44. The method of claim 43, wherein the first initiating participant, the second initiating participant, the first receiving participant, and the second receiving participant correspond to a first content consumer, a first content distributor entity, a second content consumer, and a second content distributor entity, respectively.

45. The method of claim 43, wherein the first initiating participant transfers the media content rights of the media content to one of the first receiving participant or the second receiving participant,
wherein media content rights to the media content with a set of associated constraints are secured and owned by one of the first initiating participant or the second initiating participant, and
wherein one of the first initiating participant or the second initiating participant with the media content rights initiates the media content rights transferal.

46. The method of claim 45, further comprising:
connecting, by a first consumer device associated with the first initiating participant, to the first gateway node to retrieve a set of media content for which media content rights are secured from the associated instance of the distributed media rights transaction ledger; and
presenting, by a first consumer device associated with the first initiating participant, the retrieved set of media content for which the media content rights are secured on the first consumer device associated with the first initiating participant,
wherein the media content rights correspond to one or more of playback media content rights, download media content rights, download media content rights, or the media content rights transferal.

47. The method of claim 46, wherein the first initiating participant issues the request for the media content rights transferal of the media content to one of the first receiving participant or the second receiving participant, and
wherein the request for the media content rights transferal issued to the first gateway node comprises at least identifiers associated with one of the first initiating participant or the second initiating participant, the media content, a respective owner of the media content transferal rights, the first receiving participant and the second receiving participant retrieved from the distributed media rights transaction ledger.

48. The method of claim 47, further comprising, based on the request for the media content rights transferal, traversing, the first gateway node, the associated instance of the distributed media rights transaction ledger to determine that the first initiating participant has active media content rights, and/or that one of the first initiating participant or the second initiating participant has a permission to transfer media content rights for the media content based on the set of associated constraints.

49. The method of claim 48, further comprising searching, by the first gateway node, for a media content rights transaction associated with the identifiers retrieved from the distributed media rights transaction ledger for the determination that the first initiating participant has active media content rights.

50. The method of claim 48, wherein the set of associated constraints are defined by a set of negotiated media content rights, and
wherein the set of associated constraints comprises at least a time duration for length of the media content rights transferal, one or more restrictions associated with the first receiving participant and the second receiving participant, a download or offline access, a condition whether initiating and receiving participants can leverage the media content simultaneously or if mutually exclusive media content rights transferal is permitted where only one of the initiating or receiving participants can leverage the media content at a given time, playback frequency limits, and restrictions and quality level related to a second consumer device.

51. The method of claim 47, further comprising:
presenting, by the first gateway node, the set of associated constraints of the media content rights transferal associated with one of the first receiving participant or the second receiving participant to one of the first initiating participant or the second initiating participant,
wherein the associated instance of the distributed media rights transaction ledger is traversed to determine the address of one of the second node or the second gateway node associated with at least the identifier of one of the first receiving participant or the second receiving participant based on acceptance of the set of associated constraints by one of the first initiating participant or the second initiating participant.

52. The method of claim 43, wherein the initial media content rights transaction further includes identifiers associated with one or more of the first initiating participant or the second initiating participant, the media content, media content transferal rights owner, the first receiving participant or the second receiving participant, parameters associated with a specific media content rights transferal, a cryptographic identifier of media content rights transaction data that can be referenced by another media content rights transaction, cryptographically signed by the first initiating participant or the second initiating participant.

53. The method of claim 45, further comprising, based on the initial media content rights transaction:
validating, by one of the second gateway node or the second node, that one of the first receiving participant and the second receiving participant can accept the request for the media content rights transferal based on a confirmation that the set of associated constraints is non-conflicting against one of the first initiating participant or the second initiating participant.

54. The method of claim 45, wherein the new media content rights response transaction includes one or more of a media content rights transaction that indicates a response to the grant offer cryptographically signed by the first receiving participant or the second receiving participant to verify the authenticity of the new media content rights response transaction, an acceptance response value or a reject response value, a counter offer, or a cryptographic identifier of the new media content rights response transaction for being referenced by another media content rights transaction.

55. The method of claim 54, wherein, based on a receipt of the new media content rights response transaction:
appending, by the first gateway node, new media content rights response transaction data to the associated instance of the distributed media rights transaction ledger based on the acceptance response value in the new media content rights response transaction; and
broadcasting, by the first gateway node, the appended new media content rights response transaction data to the plurality of nodes on the communication network.

56. The method of claim 54, further comprising informing, by the first gateway node, a first consumer device that media content rights transferal is declined based on the rejection response value in the new media content rights response transaction.

57. The method of claim 43, wherein the second initiating participant transfers the media content rights of the media content to the first receiving participant,
wherein media content rights to the media content with a set of associated constraints are secured by the second initiating participant,
wherein the first receiving participant or the second receiving participant generates the request for the media content rights transferal from the first initiating participant or the second initiating participant with the media content rights to the media content or elects for the media content rights transferal to the second receiving participant.

58. The method of claim 57, wherein the request for the media content rights transferal is a direct request from the first receiving participant, and
wherein the direct request comprises information associated with one of the first initiating participant or the second initiating participant, the media content, and an owner of the media content transferal rights, based on the associated instance of the distributed media rights transaction ledger.

59. The method of claim 57, further comprising searching, by the first node associated with the second initiating participant, for a media content rights transaction associated with the media content or identifier of an owner of the media content transferal rights retrieved from the distributed media rights transaction ledger for determination that the second initiating participant has active media content rights.

60. The method of claim 59, wherein the set of associated constraints are defined by a set of negotiated media content rights, and
wherein the set of associated constraints comprises at least a time duration for length of the media content rights transferal, one or more restrictions associated with the first receiving participant, a download or offline access, a condition whether one of the first initiating participant or the second initiating participant and the first receiving participant can leverage the media content simultaneously or if mutually exclusive media content rights transferal is permitted where only one of the first initiating participant or the second initiating participant and the first receiving participant can leverage the media content at a given time, playback frequency limits, and restrictions and quality level related to a second consumer device.

61. The method of claim 57, further comprising distributing, by the first node associated with the second initiating participant, the request for the media content rights transferal to one or more nodes of the plurality of nodes associated with the second initiating participant when the first node fails to process the request.

62. The method of claim 57, further comprising, based on the initial media content rights transaction:
validating, by the second gateway node associated with the first receiving participant, that one of the first receiving participant or the second receiving participant can accept the request for the media content rights transferal based on a confirmation that the set of associated constraints is non-conflicting against the second initiating participant; and
presenting, by the second gateway node associated with the first receiving participant, one or more options to the first receiving participant to respond to the issued new media content rights response transaction, wherein the one or more options for the issued new media content rights response transaction is one of an acceptance, a rejection or a counter of the grant offer for the media content rights transferal.

63. The method of claim 62, further comprising issuing, by the second gateway node, a rejection media content rights transaction as the new media content rights response transaction to the first node associated with the second initiating participant based on the rejection of the grant offer for the media content rights transferal by the first receiving participant.

64. The method of claim 63, wherein, based on the rejection media content rights transaction, the second initiating participant ceases to negotiate with the first receiving participant for the media content rights transferal.

65. The method of claim 62, further comprising, based on the acceptance of the grant offer for the media content rights transferal by the first receiving participant:
issuing, by the second gateway node, an acceptance media content rights transaction as the new media content rights response transaction to the first node associated with the second initiating participant,
　wherein new media content rights response transaction data is broadcasted to the plurality of nodes in the communication network and appended in the plurality of instances of the distributed media rights transaction ledger associated with the respective node of the plurality of nodes, and
　wherein the new media content rights response transaction data comprises at least a summary of exchange of media content rights transactions between one of the second gateway node or the second node and the first node.

66. The method of claim 62, based on the countering of the grant offer for the media content rights transferal by the first receiving participant, further comprising accepting, rejecting or countering the counter of the grant offer by the second gateway node.

67. The method of claim 43, wherein the second initiating participant transfers the media content rights of the media content to the second receiving participant,
　wherein media content rights to the media content with a set of associated constraints are secured and owned by the second initiating participant, and
　wherein the second receiving participant generates the request for the media content rights transferal for the second initiating participant, or the second initiating participant with the media content rights or elects for the media content rights transferal to the second receiving participant.

68. The method of claim 67, wherein the second initiating participant determines a requirement for the media content rights transferal for redistribution of the media content.

69. The method of claim 68, wherein the determination of the requirement for the media content rights transferal and/or the received request for the media content rights transferal is based on information associated with one or more of:
　consumption history of a first content consumer or a group of content consumers, wherein the consumption history is retrieved from the associated instance of the distributed media rights transaction ledger,
　historical media content rights acquisition for a content consumer or a group of content consumers, wherein the information associated with historical content rights acquisition is retrieved from the associated instance of the distributed media rights transaction ledger,
　historical media content rights acquisition for an entity or entities, wherein the information associated with the historical media content rights acquisition for the entity or entities is retrieved from the associated instance of the distributed media rights transaction ledger, and
　historical media content rights acquisition from an entity or entities, wherein the information associated with the historical media content rights acquisition for the entity or entities is retrieved from the associated instance of the distributed media rights transaction ledger.

70. The method of claim 68, wherein the determination of the requirement for the media content rights transferal and/or the received request for the media content rights is based on a request for the media content rights received from at least a participant associated with a consumer device or a presence of the media content in a programming schedule of the first node, and
　wherein the consumer device is communicably coupled to the first node in the communication network.

71. The method of claim 68, wherein the determination of the requirement for the media content rights transferal and/or the received request for the media content rights transferal is based on one or more of:
　a statistical analysis of a content consumer or consumers consumption habits, and/or historical pricing for at least the content consumers and/or a plurality of initiating and receiving entities,
　a predictive model to anticipate demand for the requested media content,
　　wherein the anticipated demand for the media content is based on one or more of a significant world event, a popularity change of a public figure, another popularity change of a subject matter, cultural influences, social and societal trends, demographics, a release or future release of alternative or related media content, a program schedule of an entity, and/or on-demand user requests.

72. The method of claim 67, wherein the initial media content rights transaction further includes identifiers associated with the second initiating participant, the media content, media content transferal rights owner, the second receiving participant, parameters associated with a specific media content rights transferal, a cryptographic identifier of media content rights transaction data that can be referenced by another media content rights transaction, cryptographically signed by the first initiating participant or the second initiating participant.

73. The method of claim 43, wherein the grant offer for corresponding media content rights included in the initial media content rights transaction comprises one or more of a monetary value, a trade for existing media content rights, and/or statistical data to be used for the evaluation of the grant offer by the second receiving participant.

74. The method of claim 67, wherein the initial media content rights transaction between the first node associated with the second initiating participant and the second node associated with the second receiving participant is not broadcasted to remaining nodes of the plurality of nodes in the communication network.

75. The method of claim 74, wherein the initial media content rights transaction between the first node associated with the second initiating participant and the second node associated with the second receiving participant is re-broadcasted to defined nodes associated with the second initiating participant and the second receiving participant to maintain synchronization.

76. The method of claim 43, further comprising, for the issuance of the new media content rights response transaction, determining, by the second node associated with the second receiving participant, the new media content rights response transaction based on a verification, evaluation, and/or acceptance of the grant offer, upon a receipt of the initial media content rights transaction issued by the second initiating participant,
　wherein the issued new media content rights response transaction is one of a media content rights accept transaction, a media content rights reject transaction, or a media content rights counter transaction.

77. The method of claim 76, further comprising:
　rejecting, by the second node associated with the second receiving participant, the grant offer for the media content rights transferal; and
　issuing, by the second node associated with the second receiving participant, the media content rights reject transaction as the new media content rights response transaction to the second node associated with the second initiating participant.

78. The method of claim 76, further comprising, based on the media content rights reject transaction issued by the second node associated with the second receiving participant:
ceasing, by the first node associated with the second initiating participant, to negotiate with the second node associated with the second receiving participant for current session; and
initiating, by the first node associated with the second initiating participant, to negotiate with nodes associated with participants other than the first node.

79. The method of claim 76, further comprising:
accepting, by the second node associated with the second receiving participant, the grant offer for the media content rights transferal; and
issuing, by the second node associated with the second receiving participant, the media content rights accept transaction as the new media content rights response transaction to the first node associated with the second initiating participant.

80. The method of claim 79, further comprising, based on the media content rights accept transaction issued by the second node associated with the second receiving participant:
issuing, by the first node associated with the second initiating participant, one or more other media content rights rejection transactions to one or more nodes other than the second receiving participant for current session.

81. The method of claim 76, further comprising, broadcasting, by the second node associated with the second receiving participant, the new media content rights response transaction to the plurality of nodes in the communication network based on the media content rights accept transaction,
wherein the new media content rights response transaction comprises at least an encrypted summary of exchange of one or more other new media content rights response transactions issued between nodes associated with the first initiating participant and the second node associated with the second receiving participant, such that a summary can be decrypted by the first node associated with the second initiating participant and the second node associated with the second receiving participant.

82. The method of claim 76, wherein the new media content rights response transaction is appended to the plurality of instances of the distributed media rights transaction ledger associated with respective node of the plurality of nodes.

83. The method of claim 76, further comprising:
countering, by the second node associated with the second receiving participant, the grant offer for corresponding media content rights for an alternative grant offer,
wherein the alternative grant offer comprises at least supplemental media content rights, monetary value, a trade for existing media content rights, and/or statistical data; and
issue the media content rights counter transaction, which comprises the alternative grant offer, as the new media content rights response transaction to the first node associated with the second initiating participant.

84. The method of claim 83, further comprising choosing, by the second initiating participant, to accept, reject, or counter in response to the media content rights counter transaction received from the second node associated with the second receiving participant based on the media content rights counter transaction.

85. A non-transitory computer-readable medium having stored thereon, computer implemented instruction that when executed by a processor in a computer, causes the computer to execute operations, the operations comprising:
in a communication network:
receiving, by one of a first gateway node or a first node of a plurality of nodes, associated with one of a first initiating participant or a second initiating participant, respectively, a request or determine a need for media content rights transferal of a media content, wherein one of the first gateway node or the first node of the plurality of nodes is configured to interact with one of a second node or a second gateway node based on a defined protocol in the communication network;
traversing, by one of the first gateway node or the first node of the plurality of nodes, associated with one of the first initiating participant or the second initiating participant, respectively, an associated instance of a distributed media rights transaction ledger to determine an address of one of the second node or the second gateway node associated with at least an identifier of one of a first receiving participant or a second receiving participant;
issuing, by one of the first gateway node or the first node of the plurality of nodes, associated with one of the first initiating participant or the second initiating participant, respectively, an initial media content rights transaction, which includes at least a transaction identifier that indicates a grant offer for the media content rights transferal, to one of the second node or the second gateway node;
issuing, by one of the second gateway node associated with the first receiving participant or the second node associated with the second receiving participant, a new media content rights response transaction based on verification, evaluation, and/or acceptance of the grant offer in the initial media content rights transaction,
wherein based on the new media content rights response transaction, a media content rights transferal transaction is executed between one of the first initiating participant or the second initiating participant and one of the first receiving participant or the second receiving participant,
wherein each instance of a plurality of instances of the distributed media rights transaction ledger is associated with a respective node of the plurality of nodes; and
validating, by one of the second gateway node or the second node, the second gateway node being associated with the first receiving participant, authenticity of the request for the media content rights transferal based on verification of cryptographic signature of one of the first initiating participant or the second initiating participant, and
wherein each instance of the distributed media rights transaction ledger is appended with at least the initial media content rights transaction, the new media content rights response transaction, and/or the media content rights transferal transaction.

* * * * *